United States Patent
Stallmo et al.

[19]

[11] Patent Number: 6,052,759
[45] Date of Patent: Apr. 18, 2000

[54] METHOD FOR ORGANIZING STORAGE DEVICES OF UNEQUAL STORAGE CAPACITY AND DISTRIBUTING DATA USING DIFFERENT RAID FORMATS DEPENDING ON SIZE OF RECTANGLES CONTAINING SETS OF THE STORAGE DEVICES

[76] Inventors: David C. Stallmo, 59 Beaver Way, Boulder, Colo. 80304; Randy K. Hall, 400 Oneida St., Boulder, Colo. 80303

[21] Appl. No.: 09/191,717

[22] Filed: Nov. 12, 1998

Related U.S. Application Data

[62] Division of application No. 08/516,232, Aug. 17, 1995, Pat. No. 5,875,456.

[51] Int. Cl.[7] .............................. G06F 13/00; G06F 11/16; G06F 12/06
[52] U.S. Cl. ......................... 711/114; 711/170; 711/171; 714/6; 714/7; 714/770
[58] Field of Search ..................................... 711/114, 112, 711/162, 170, 171; 714/710, 770, 5, 6, 7, 42

[56] References Cited

U.S. PATENT DOCUMENTS

| | | | |
|---|---|---|---|
| 4,092,732 | 5/1978 | Ouchi .......................................... | 714/6 |
| 4,761,785 | 8/1988 | Clark et al. ................................. | 714/6 |
| 4,817,035 | 3/1989 | Timsit ..................................... | 711/114 |
| 4,870,643 | 9/1989 | Bultman et al. ......................... | 714/764 |
| 4,899,342 | 2/1990 | Potter et al. ............................. | 714/763 |
| 4,914,656 | 4/1990 | Dunphy, Jr. et al. .................... | 714/770 |
| 4,993,030 | 2/1991 | KraKauer et al. ....................... | 714/763 |
| 5,208,813 | 5/1993 | Stallmo ................................... | 711/114 |
| 5,235,601 | 8/1993 | Stallmo et al. .......................... | 714/770 |
| 5,258,984 | 11/1993 | Menon et al. ........................... | 714/710 |
| 5,265,098 | 11/1993 | Mattson et al. .......................... | 714/710 |
| 5,274,799 | 12/1993 | Brant et al. .............................. | 711/143 |
| 5,390,327 | 2/1995 | Lubbers et al. .......................... | 714/770 |
| 5,392,244 | 2/1995 | Jacobson et al. ........................ | 711/114 |
| 5,517,632 | 5/1996 | Matsumoto et al. .................... | 711/114 |
| 5,519,844 | 5/1996 | Stallmo ................................... | 711/114 |
| 5,519,849 | 5/1996 | Malan et al. ............................. | 711/114 |
| 5,524,204 | 6/1996 | Verdoorn, Jr. ........................... | 711/114 |
| 5,875,459 | 2/1999 | Taoda ...................................... | 711/114 |

*Primary Examiner*—Glenn Gossage
*Attorney, Agent, or Firm*—James R. Young

[57] ABSTRACT

A Redundant Array of Independent Disks (RAID) system that is adaptable to host Input/Output traffic, wherein the RAID configuration is hidden from the host computer, and wherein the system uses various methods for striping and organizing data across the array when disks are added or removed. The system dynamically determines the RAID configuration used to store host data. To maximize response time and avoid a write penalty, small write operations are mapped into RAID 1 configurations, and medium and large write operations are mapped into RAID 3 configurations. The data are migrated into RAID 5 configurations as a background operation, to minimize the disk space lost. The system hides configuration changes necessary for the addition and/or removal of disks to/from the disk array by unstriping data, adding or deleting (removing) a disk and then restriping data over all the disks. The methods may include steps of dividing data blocks into a plurality of square portions, and exchanging data in sets of blocks of each of the square portions, with the exchanging step including locating a diagonal set of blocks within a selected square portion, and exchanging all sets of blocks equidistant from the diagonal, on opposite sides of the diagonal, and in a line perpendicular to the diagonal. While these changes are in progress, the disk array remains on-line and most host data is available for access and modification.

6 Claims, 21 Drawing Sheets

| BLOCK | DISK | | | | |
|---|---|---|---|---|---|
| | 0 | 1 | 2 | 3 | 4 |
| 0 | 0 | 8 | 16 | 24 | P |
| 1 | 1 | 9 | 17 | 25 | P |
| 2 | 2 | 10 | 18 | 26 | P |
| 3 | 3 | 11 | 19 | 27 | P |
| 4 | 4 | 12 | 20 | 28 | P |
| 5 | 5 | 13 | 21 | 29 | P |
| 6 | 6 | 14 | 22 | 30 | P |
| 7 | 7 | 15 | 23 | 31 | P |

*FIG. 16*

METHOD FOR ORGANIZING STORAGE DEVICES OF UNEQUAL STORAGE CAPACITY AND DISTRIBUTING DATA USING DIFFERENT RAID FORMATS DEPENDING ON SIZE OF RECTANGLES CONTAINING SETS OF THE STORAGE DEVICES

This application is a divisional of application Ser. No. 08/516,232, filed Aug. 17, 1995, now U.S. Pat. No. 5,875,456 of David C. Stallmo and Randy K. Hall, entitled Storage Drive Array and Methods for Striping and Unstriping Data and for Adding and Removing Disks Online To/Form a RAID Storage Array.

CROSS REFERENCE TO RELATED APPLICATIONS

This application is related to application Ser. No. 08/516,293, filed Aug. 17, 1995, of David C. Stallmo and randy K. Hall, entitled "Method and Apparatus for Improving Performance in a Redundant Array of Independent Disks", now U.S. Pat. No. 5,657,468.

FIELD OF THE INVENTION

This invention relates to computer systems and more particularly to disk devices within such computer systems. Even more particularly, the invention relates to a Redundant Array of Independent Disks (RAID) system.

BACKGROUND OF THE INVENTION

In a typical computer system, several disk devices are attached to a host computer. Data blocks are transferred between the host computer and each of the disks as application programs read or write data from or to the disks. This data transfer is accomplished through a data I/O bus that connects the host computer to the disks. One such data Input/Output (I/O) bus is called a small computer system interface (SCSI) bus and is commonly used on systems ranging in size from large personal computers to small mainframe computers.

Although each drive attached to the SCSI bus can store large amounts of data, the drives physically cannot locate and retrieve data fast enough to match the speed of a larger host processor, and this limitation creates an I/O bottleneck in the system. To further aggravate the problem, system configurations frequently dedicate one drive to one specific application. For example, in the Unix® Operating System (Unix is a trademark of A T & T), a Unix file system can be no larger than a single disk, and often a single disk is dedicated to a single file system. To improve performance, a particular file system may be dedicated to each application being run. Thus, each application will access a different disk, improving performance.

Disk arrays, often called redundant arrays of independent (or inexpensive) disks (RAID), alleviate this I/O bottleneck by distributing the I/O load of a single large drive across multiple smaller drives. The SCSI interface sends commands and data to the RAID system, and a controller within the RAID system receives the commands and data, delegates tasks to independent processes within the array controller, and these independent processes address one or more of the independent disks attached to the RAID system to provide the data transfer requested by the host system.

One way a RAID system can improve performance is by striping data. Striping of data is done by writing data from a single file system across multiple disks. This single file system still appears to the host system as a single disk, since the host system expects a single file system to be located on a single disk. The RAID system translates the request for data from a single file system and determines which of the physical disks contains the data, then retrieves or writes the data for the host. In this manner, application programs no longer need a file system dedicated to their needs, and can share file systems knowing that the data is actually spread across many different disks.

A stripe of data consists of a row of sectors located in a known position on each disk across the width of the disk array. Stripe depth, or the number of sectors written on a disk before writing starts on the next disk, is defined by the sub-system software. The stripe depth is typically set by the number of blocks that will need to be accessed for each read or write operation. That is, if each read or write operation is anticipated to be three blocks, the stripe depth would be set to three or more blocks, thus, each read or write operation would typically access only a single disk.

Six types of RAID configuration levels have been defined, RAID 0 through RAID 5. This definition of the RAID levels was initially defined by the University of California at Berkeley and later further defined and expanded by an industry organization called the RAID Advisory Board (RAB). Each of the RAID levels have different strengths and weaknesses.

A RAID 0 configuration stripes data across the disk drives, but makes no provision to protect data against loss. In RAID 0, the drives are configured in a simple array and data blocks are striped to the drives according to the defined stripe depth. Data striping allows multiple read and write operations to be executed concurrently, thereby increasing the I/O rate, but RAID 0 provides no data protection in the event one of the disk drives fails. In fact, because the array contains multiple drives, the probability that one of the array drives will fail is higher than the probability of a single drive system failure. Thus, RAID 0 provides high transaction rates and load balancing but does not provide any protection against the loss of a disk and subsequent loss of access to the user data.

A RAID 1 configuration is sometimes called mirroring. In this configuration, data is always written to two different drives, thus the data is duplicated. This protects against loss of data, however, it requires twice as much disk storage space as a RAID 0 system. Thus, RAID 1 provides protection against the loss of a disk, with no loss of write speeds and transaction rates, and a possible improvement in read transaction rates, however RAID 1 uses twice as much disk space to provide the protection.

A RAID 2 configuration stripes data across the array of disks, and also generates error correction code information stored on a separate error correction code drive. Usually the ratio of error correction drives to data drives is relatively high, up to approximately 40%. Disk drives ordinarily provide their own redundancy information stored with each block on the drive. Thus, RAID 2 systems duplicate this redundancy information and require significantly more time and space to be cost effective, so they are seldom used.

A RAID 3 configuration implements a method for securing data by generating and storing parity data, and RAID 3 provides a larger bandwidth for applications that process large files. In a RAID 3 configuration, parity data are stored on a dedicated drive, requiring one drive's worth of data out of the array of drives, in order to store the parity information. Because all parity information is stored on a single drive, this drive becomes the I/O bottleneck, since each write operation must write the data on the data drive and must further update the parity on the parity drive. However, when large blocks of data are written, RAID 3 is an efficient configuration. RAID 3 provides protection against the loss of a disk with no loss of write or read speeds, but RAID 3 is only suited to large read and write operations. The RAID 3 transaction rate matches that of a single disk and, in a pure implementation, requires the host to read and write in multiples of the number of data disks in the RAID 3 group, starting on the boundary of the number of data disks in the RAID 3 group.

A RAID 4 configuration stores user data by recording parity on a dedicated drive, as in RAID 3, and transfers blocks of data to single disks rather than spreading data blocks across multiple drives. Since this configuration has no significant advantages over RAID 3, it is rarely, if ever, used.

A RAID 5 configuration stripes user data across the array and implements a scheme for storing parity that avoids the I/O bottleneck of RAID 3. Parity data are generated for each write, however, parity sectors are spread evenly, or interleaved, across all drives to prevent an I/O bottleneck at the parity drive. Thus, the RAID 5 configuration uses parity to secure data and makes it possible to reconstruct lost data in the event of a drive failure, while also eliminating the bottleneck of storing parity on a single drive. A RAID 5 configuration is most efficient when writing small blocks of data, such that a block of data will fit on a single drive. However, RAID 5 requires, when writing a block of data, that the old block of data be read, the old parity data be read, new parity be generated by removing the old data and adding the new data. Then the new data and the new parity are written. This requirement to read, regenerate and rewrite parity data is termed a read/modify/write sequence and significantly slows the rate at which data can be written in a RAID 5 configuration. Thus this requirement creates a "write penalty." To minimize the performance impact, RAID 5 stripe depth can be set to be much larger than the expected data transfer size, so that one block of data usually resides on one drive. Consequently, if new data are to be written, only the effected data drive and the drive storing parity data need be accessed to complete the write operation. Thus, RAID 5 provides protection against the loss of a disk at the cost of one disk's worth of space out of the total number of disks being used; RAID 5 is oriented to transaction processing; and RAID 5 can support large numbers of read operations. However, the read/modify/write sequence causes RAID 5 to have a "write penalty".

In practice, RAID configurations 1, 3, and 5 are most commonly used.

The RAID system manufacturers have had a reasonable understanding of the various tradeoffs for the various RAID levels and have realized that their potential customers will have differing disk I/O needs that would need differing RAID levels. The manufacturers of the first generation of RAID products tended to implement all the levels of RAID (0, 1, 3 and 5) and support the ability of allowing the customer to configure the disks being managed as a disk array to use a mixture of the supported RAID levels.

There are several problems with this approach. The first problem is one of education of the customer. The customer may be an end user, or an integrator, or an original equipment manufacturer (OEM). Providing the customer with the ability to configure the disk array requires that the customer be trained to understand the tradeoffs with the various RAID configurations. The customer also has to be trained to operate a complicated configuration management utility software program.

The main solution to the first problem has been to limit the complexity of configurations, either by the RAID manufacturer who limits the abilities of the configuration management utility program, or by the customer, who chooses a small number of possible combinations for configuration. This solution means that the customer may not necessarily use the best configuration for a given situation, which may lead to disappointing results. Also, the customer may not get full value from the RAID product.

The second problem is that the customer either doesn't know the characteristics of his disk I/O, or these characteristics change over time, or both. Educating the customer and providing a first class configuration management utility program doesn't make any difference if the characteristics of the disk I/O cannot be matched to the best RAID configuration.

The third problem is one of expectations. Customers who buy disks and disk subsystems use two basic measurements to evaluate these systems. The first measurement covers the characteristics of the attached disks. Disks are presently sold as commodities. They all have the same basic features, use the same packaging and support the same standardized protocols. Customers can compare the disks by cost per megabyte, packaging size (5¼", 3½", etc.), capacity, spin rate and interface transfer rate. These measurements can be used to directly compare various disk products.

The second measurement is performance when attached to a host computer. It is often possible to use performance tools on the host computer that will report transaction data, such as response time, I/O operations per second, data transfer rate, request lengths in bytes, and request types, such as reads vs writes. It is also common to measure total throughput by using a performance tool to report throughput, or by simply running applications and measuring elapsed time.

A typical customer's expectation is that a new product will not be slower than the products the customer has been using. The customer is happy to get additional protection against the loss of a disk by using a disk array, and is even willing to pay a small premium for this protection, since they can measure the additional cost against the additional protection. But the customer is not generally willing to accept slower performance because of a "write penalty".

Disk array products will continue to be evaluated in the same manner as normal disk products are evaluated. In order for disk arrays to be totally competitive in the disk products market they will have to eliminate the "write penalty" in all of the commonly used cases.

A fourth problem with requiring the customer to set the configuration is that RAID manufacturers often do not allow dynamic changes to the RAID configuration. Changing the number of disks being used, and changing the levels of protection provided at each target address, often requires that data be migrated to a backup device before the configuration change can be made. After the configuration is changed, the managed disks are re-initialized and the data is then copied back to the disk array from the backup device. This process can take a long time and while it is in progress, the disk array is off-line and the host data is not available.

The current generation of disk arrays appeared in the late 1980's. This generation is divided into completely software versions, that are implemented directly on the host using the host's processor and hardware, and versions using separate hardware to support the RAID software.

The hardware implementation of disk arrays takes multiple forms. The first general form is a Printed Circuit (PC) board that can plug directly into the system bus of the host system. The second general form is a PC board set (one or more boards) that is built into a stand-alone subsystem along with a set of disks. This subsystem often supports some level of fault tolerance and hot (or on line) plugability of the disks, fans, power supplies and sometimes controller boards.

Generally, the current generation of disk array systems support RAID 5, which requires fairly powerful processors for the level of processing required to support large numbers of RAID 5 requests. The controller board(s) in a disk array, as well as the fault tolerant features, increase the price of the disk array subsystem. Disk array manufacturers deal with the higher costs in the supporting hardware by supporting large numbers of disks, so that it is easier to amortize the costs of the supporting hardware.

Another problem that disk array manufacturers have is that the capacities of SCSI disks continue to increase rapidly as the cost of the disks continue to decrease rapidly. This trend has resulted in the need to be able to supply disk arrays that have small numbers of disks (3–4) to provide an entry level product, while at the same time, the disk array has to be expandable to allow for growth of the available disk space by the customer. Therefore, disk array controller boards commonly support multiple SCSI channels, typically eight or more, and a SCSI 1 channel can support six or seven disks, reserving one or two IDs for initiators, which allows the disk array to support 48 or more disks. This range of disks supported requires controller board(s) that are powerful enough to support a substantial number of disks, 48 or more, while at the same time are cheap enough to be used in a disk array subsystem that only has 3 or 4 disks.

It is thus apparent that there is a need in the art for an improved method and apparatus which allows a dynamic configuration change, allows a disk to be added to the array, or allows a disk to be removed from the array without having to unload and reload the data stored in the array. There is another need in the art for a system that removes the write penalty from a disk array device. The present invention meets these and other needs in the art.

SUMMARY OF THE INVENTION

It is an aspect of the present invention to provide a Redundant Array of Independent Disks (RAID) system wherein the particular type of processing being performed is transparent to the host computer system.

It is another aspect of the invention to transpose the data within the RAID system to change from one RAID variation to another.

Another aspect of the invention is to allow a disk to be added to the array, while any data present on the disk, when it is added, remains available.

Yet another aspect is to allow a disk to be removed from the array, while data on all other disks remains available to the host as the disk array re-configures itself to use only the remaining disks.

Still another aspect of the invention is to allow parity protection to be added to or removed from the array.

A still further aspect is to provide a system that usually removes the write penalty while still providing full RAID functionality.

The above and other aspects of the invention are accomplished in a RAID system that is adaptable to host I/O reads and writes of data. The RAID variations are hidden from the host, thus the system removes the need for a customer to understand the various possible variations within the RAID device. Configuration of the system requires only that the host/customer/system administrator provide a level of configuration that defines the target addresses (such as SCSI IDs/Logical Unit Numbers) to which the disk array must respond, the capacity of the defined target addresses, and whether the data at each target address is to be protected against the loss of a disk.

The determination of the RAID variation used to store host data is made dynamically by the disk array of the present invention. This determination is made to maximize response time performance and also to minimize the loss of disk space used for providing protection against the loss of a disk.

The RAID variation can be changed dynamically, on-line, while the data remains available to the host and can be modified by the host. These changes in variation allow the system to reconfigure itself to allow a disk to be deleted or removed from the array, or be added to the array. In addition, a disk being added may have existing data, and this data also remains available to the host and modifiable by the host. After the disk is added, its data will be striped across all the disks of the array.

The system also hides the variation changes necessary for the addition or deletion of disks to the disk array. While these changes are in progress, the disk array remains on-line and all host data is available for access and modification. Additionally, the blocks associated with each target address can have their characteristics changed while the data remains available and modifiable. Thus the host can dynamically add new target address entries, change the number of blocks allocated to the entries, and change the protection afforded to the entries.

To maximize response time, small write operations are written into data blocks organized as a RAID 1 configuration, so there is no write penalty. These RAID 1 blocks are re-written into data blocks organized as a RAID 5 configuration, as a background operation, to minimize the disk space lost.

To maximize response time, medium and large write operations are written into data blocks organized as a RAID 3 configuration, to prevent a write penalty, to maximize bandwidth performance, and to minimize space lost to providing protection.

BRIEF DESCRIPTION OF THE DRAWINGS

The above and other aspects, features, and advantages of the invention will be better understood by reading the following more particular description of the invention, presented in conjunction with the following drawings, wherein:

FIGS. 14–16 show the data organization of a square of data, and illustrate how the data moves during a transposition from striped to un-striped in transparent RAID;

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

In a typical operating system, such as the Unix® operating system (Unix is a registered trademark of A T & T), the attached disks are independent entities. These disks have mountable file systems defined to use part or all of a disk, however, typically a file system cannot span across more than one disk. Thus a Unix system with 4 disks would have at least four mountable file systems. Normally a single application will use a set of files that all reside on the same file system.

Figure 1:
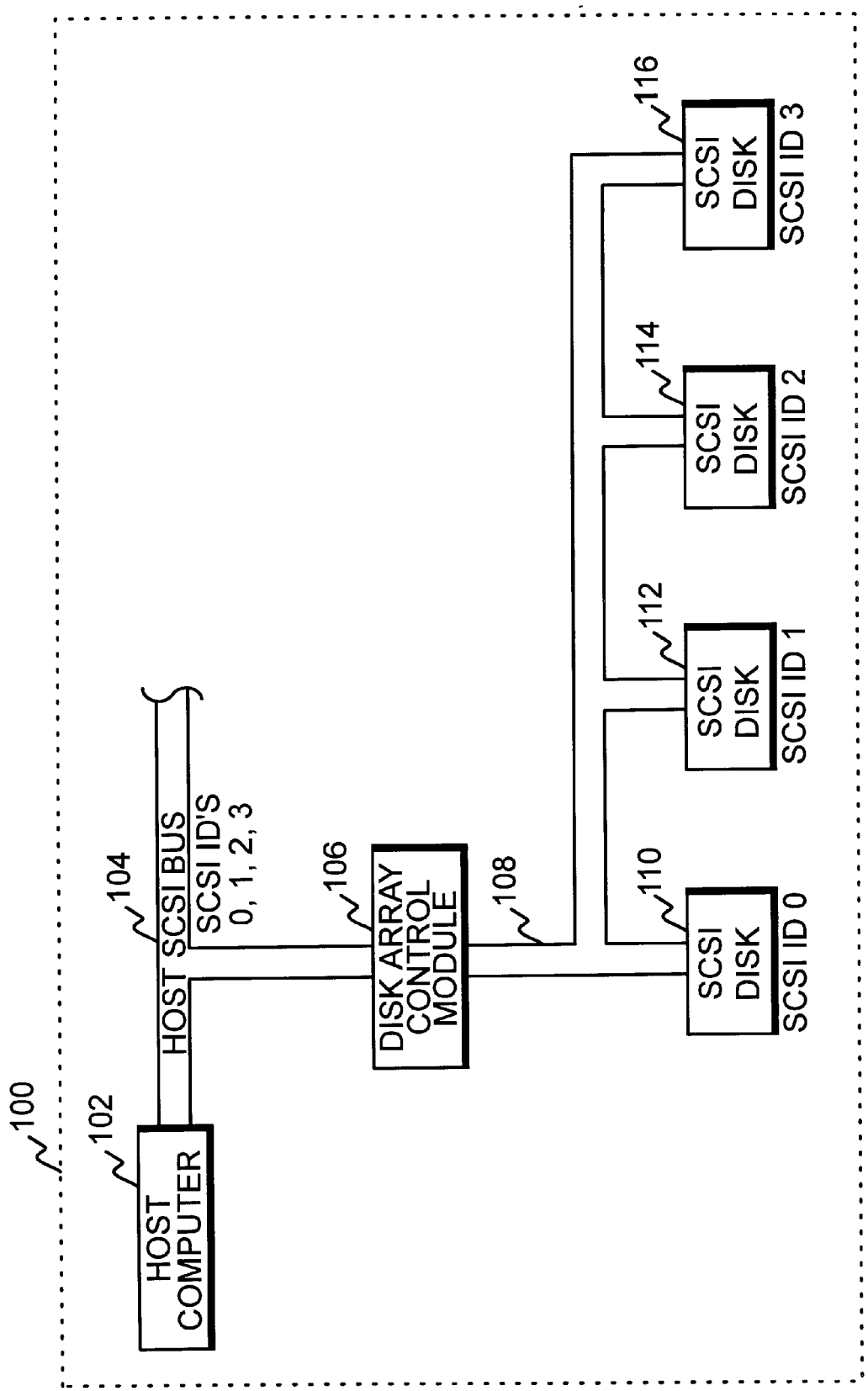
FIG. 1 shows a block diagram of a computer system having four data disks managed by a control module of the present invention.

FIG. 1 shows a computer system 100 having a host computer 102 connected to four disks. A host SCSI bus 104 connects the host computer 102 to a disk array control module or controller 106. Those skilled in the art will recognize that any type of I/O bus that connects the host computer 102 to the controller 106 will function with the invention. The control module 106 is connected to four disks 110, 112, 114, and 116 through a SCSI bus 108.

FIG. 1 also shows that the control module 106 is capable of responding to all of the SCSI device IDs and logical unit numbers (LUNs) of the managed disks. The control module 106 responds to the set of SCSI IDs and LUNs that were originally used for the disks 110, 112, 114, and 116. The SCSI ID/LUN that the control module 106 responds to may not have the data that is being requested by the host, however, the host computer 102 will still access the same SCSI IDs that were available when the managed disks 110, 112, 114, and 116 were directly connected to the host computer 102. The control module 106 will respond using the same SCSI IDs and with the same capacities and characteristics that were available when the managed disks were directly connected to the host.

The original data on the disks is redistributed and evenly striped across the disks being managed by the control module. The effect of this striping is to cause a single application's data to be evenly striped across all of the managed disks.

In an un-striped configuration, the worst case performance occurs when a single application accesses all of its data on a single file system, which is on a single disk. The best case occurs when multiple applications perform a large number of disk requests, resulting in accesses to all the file systems and disks, to provide the best overall throughput.

With the striping provided by the control module, the worst case performance also occurs when a single application accesses all of its data on a single file system. But since the data is striped across all the disks being managed by the control module, the accesses will tend to be load balanced across all the disks, so that the worst case operates at the same level as the best case operates in an un-striped configuration. Therefore, the best case, and the worst case performances for the striped data configuration are the same.

When the control module is managing a parity disk, the associated SCSI ID/LUN used by the managed parity disk is not available to the host. That is, the host cannot use the parity disk SCSI ID/LUN to communicate with the set of managed disks.

Figure 2:
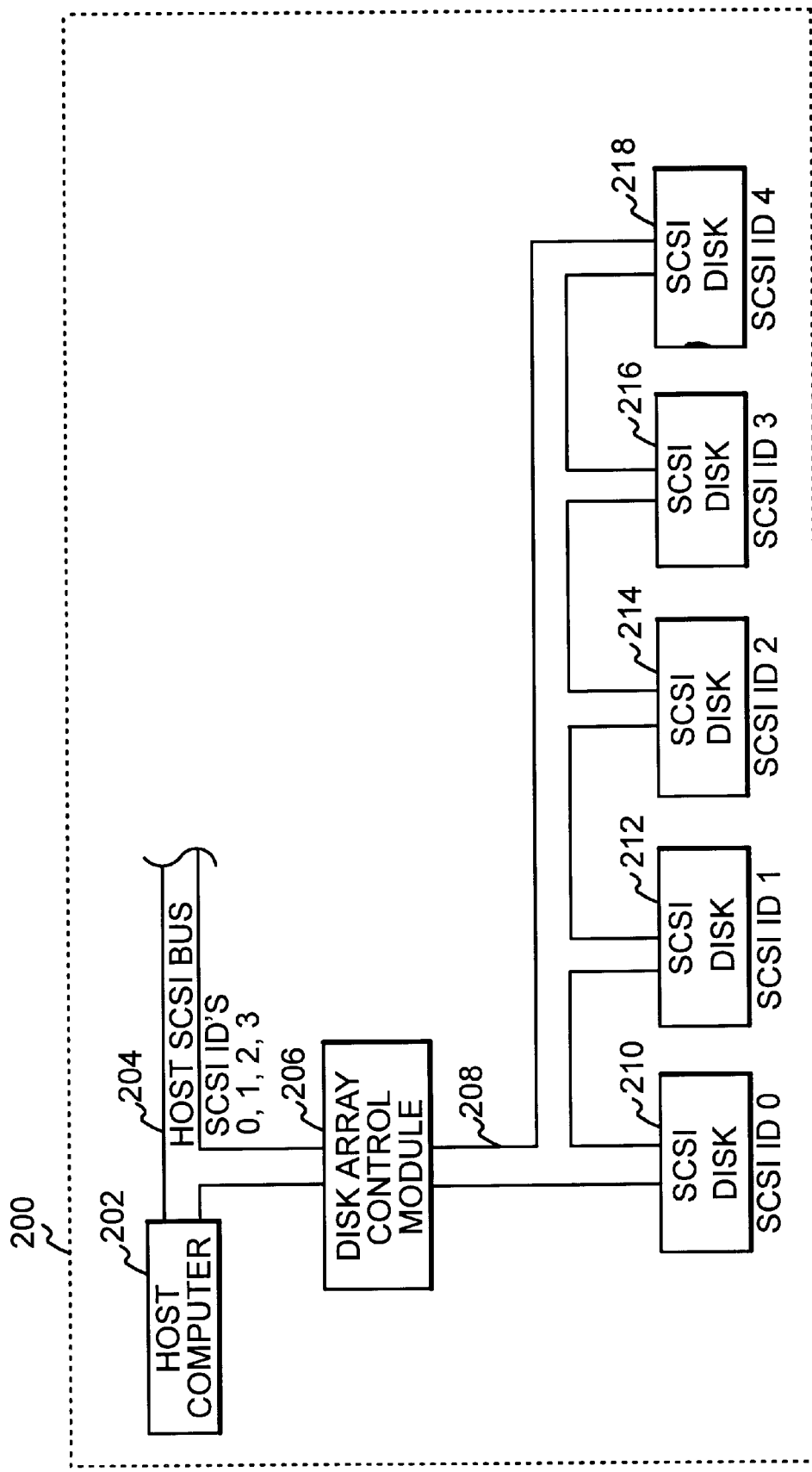
FIG. 2 shows the block diagram of FIG. 1 with an additional parity disk added to the disks being managed by the control module of the present invention.

FIG. 2 shows a computer system 200 having five managed disks 210, 212, 214, 216, and 218, wherein the fifth disk 218 is defined as a parity disk. The host computer 202 can use the SCSI IDs/LUNs for the first four disks. These SCSI IDs/LUNs will show capacities and characteristics of the first four disks 210, 212, 214, and 216 as though these disks were directly attached to the host computer 202.

The user data written by the host computer 202 is striped across all five of the disks, along with the corresponding parity data, to provide protection against the loss of one of the control modules and/or managed disk.

Figure 3:
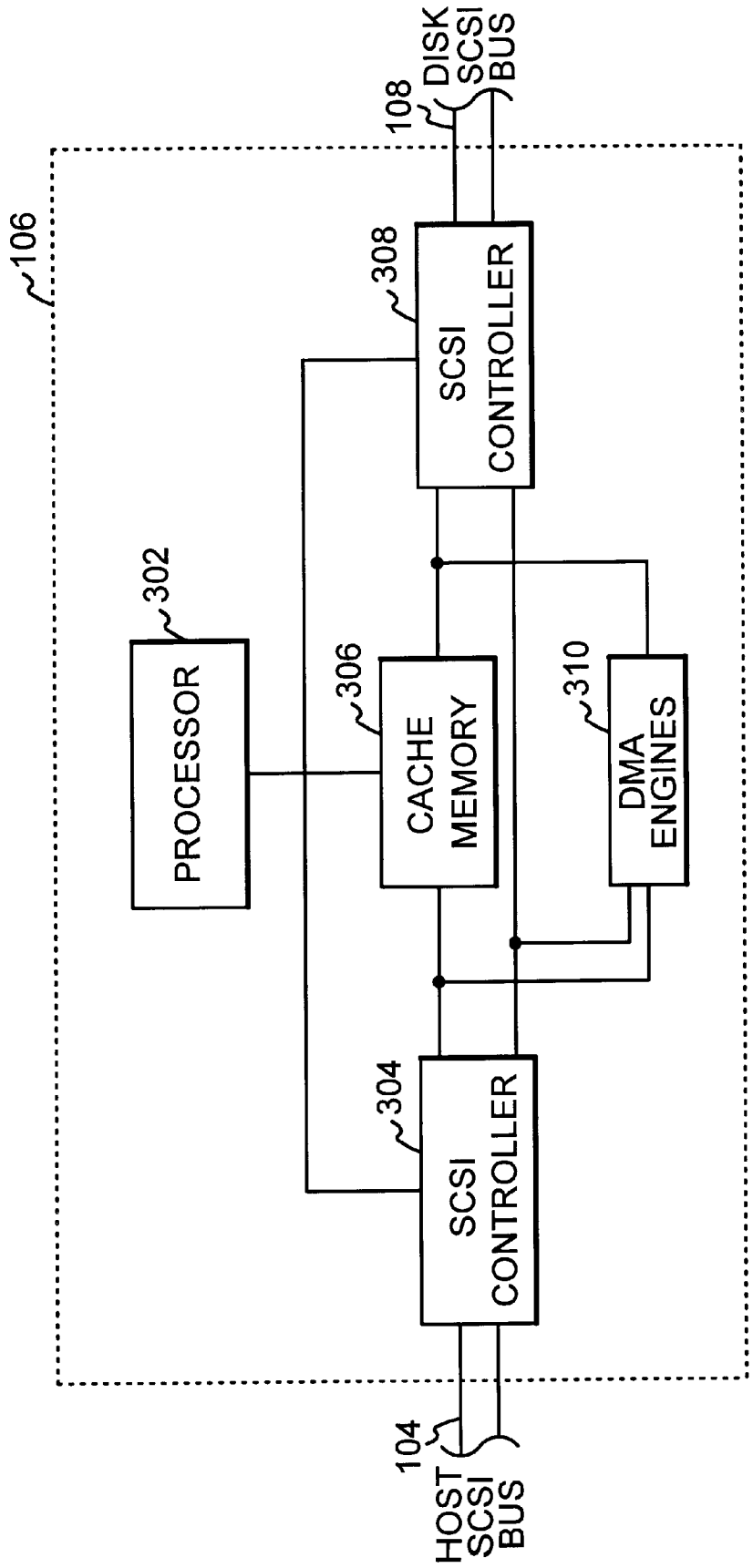
FIG. 3 shows a block diagram of the hardware of the control module of the present invention.

FIG. 3 shows a block diagram of the disk array control module 106 shown in FIG. 1. A processor 302 performs the functions of the control module through software, as described below. Input from the host SCSI bus 104 is processed by a SCSI controller 304, and managed disks are controlled through a SCSI controller 308. DMA engines 310 are used for high speed data transfer between the two SCSI busses 104 and 108, and a cache memory 306 is used to buffer data being transferred.

One goal of the system is to allow disks of varying sizes, that is having varying numbers of data blocks, to be managed and to assure that all the blocks on each disk are available to the host computer. When multiple disks are managed, they are organized into multiple "rectangles", where each rectangle has a set of disks that all contain the same number of blocks. The number of rectangles needed is determined by the number of disks that have varying sizes.

Figure 4:
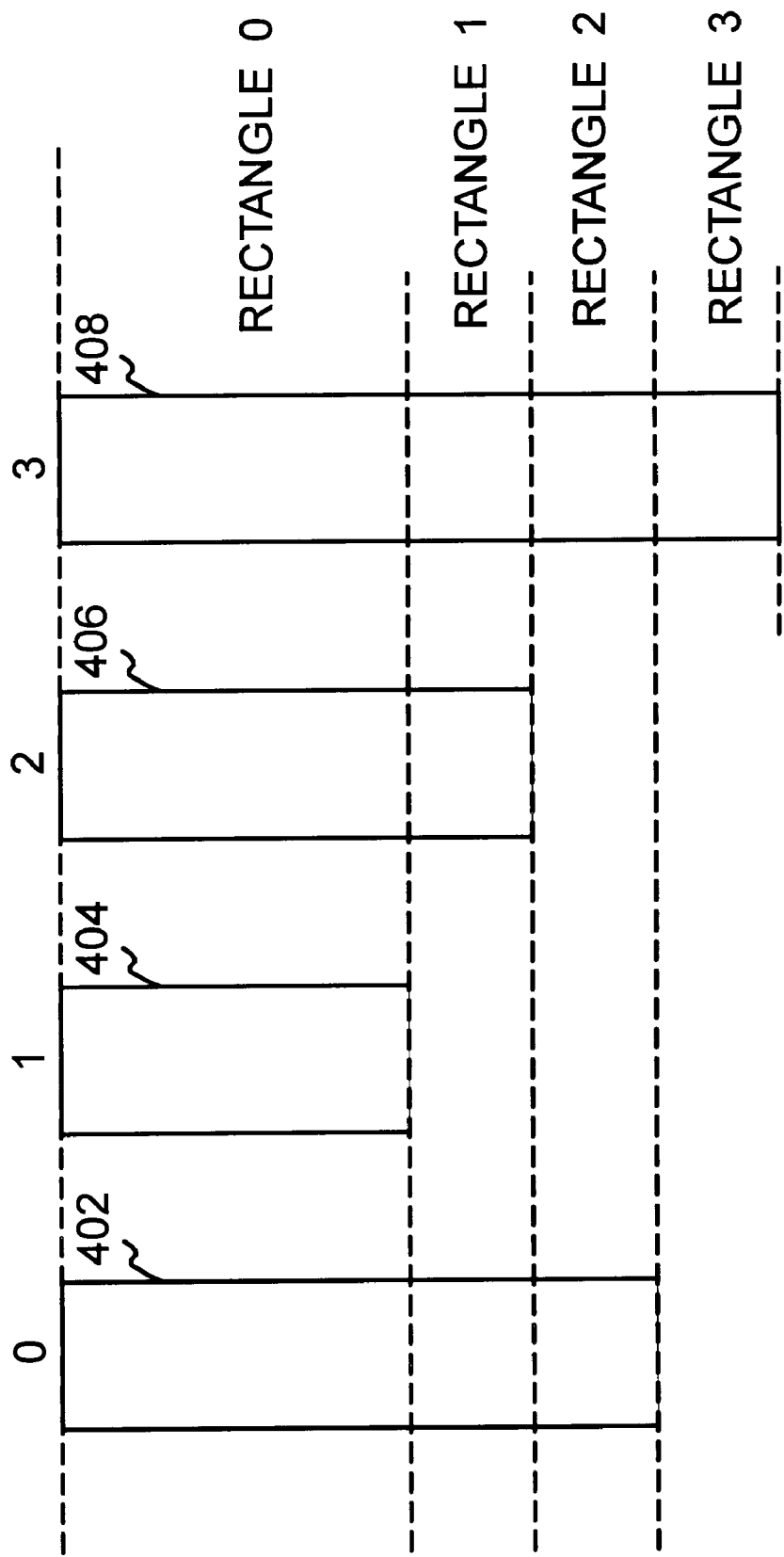
FIG. 4 shows a diagram illustrating the use of rectangles to manage disk space.

FIG. 4 shows an example of how rectangles would be organized over four disks, each capable of storing a different number of blocks. Referring to FIG. 4, disk 1 404 is the smallest disk, and it defines the size of rectangle 0. Disk 2 406 is the next largest, and the space remaining on this disk, in excess of the space used in rectangle 0, defines the size of rectangle 1. Similarly, the remaining space on disk 0 402 defines the size of rectangle 2, and the remaining space on disk 3 408 defines the size of rectangle 3.

Because of the number of disks in rectangles 0 and 1, they can be used for all RAID configurations. Rectangle 2 can only be used with RAID 0 and RAID 1, and rectangle 3 can only be used with RAID 0.

Although FIG. 4 shows the rectangles as occupying the same locations on each disk, this is not a requirement. The only requirement is that the amount of space on each disk be the same within a rectangle. The actual location of the space on each disk is not important, so long as it can be readily determined when the disk is accessed.

Another goal of the system is to allow disks that have data already stored on them to be incorporated into the set of managed disks, and to allow the data from a new disk to be spread across all the managed disks to provide significantly higher levels of performance and to allow protection against the loss of a disk. Still another goal is to dynamically add or remove a disk from the set of managed disks while maintaining the integrity and availability of the data stored in the system.

To accomplish these goals, each rectangle is divided into a set of "squares". A square is a portion of the set of disks contained within a rectangle. The number of blocks in each square is equal to the number of disks in the rectangle multiplied by the depth being used by the rectangle. Each square typically starts at the same logical block number on each disk.

Since the number of blocks in a rectangle is not necessarily an even multiple of the number of blocks in a square, there may be a "partial" at the end of the rectangle, and this partial portion contains the remaining blocks in each disk that cannot fit in a square. These partial blocks do not participate in the striping operation, described below, and thus remain un-striped. They will have data protection, however, since parity can be maintained with an un-striped configuration.

Figure 5:
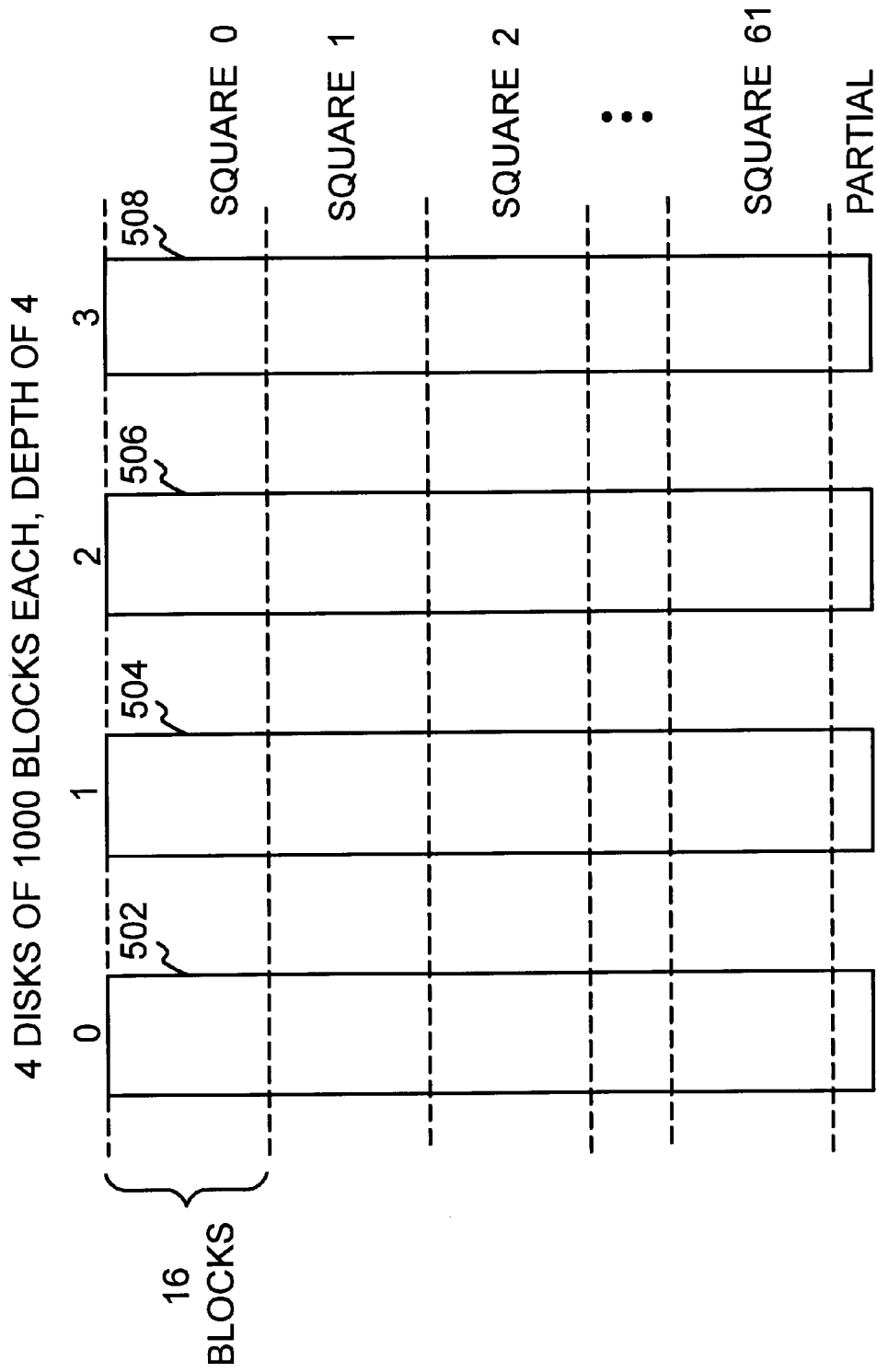
FIG. 5 shows a diagram illustrating the use of squares within rectangles to manage disk space.

FIG. 5 shows an example of a rectangle and some squares that fit into the rectangle. Referring to FIG. 5, four disks 502, 504, 506, and 508 are shown, wherein the disks comprise a rectangle containing 1000 blocks on each disk. In this example, the depth is four blocks, and since there are four disks, each square contains 16 blocks on each disk. In this example, the rectangle contains 62 squares, and there are eight blocks left over on each disk. These left over blocks comprise a partial.

The squares organization is used to allow data to be striped and un-striped across disks. Since each square has the same number of rows and columns, wherein one row is a depth's worth of blocks, and there is one column per disk, matrix transposition is used on a square to stripe and un-stripe data blocks, as will be described below with respect to FIGS. 11–16.

The management of data on the disks of the array is layered. At the first level is the management of striping of data blocks and possibly parity blocks. The first level of management is also responsible for sparing and reconstruction operations. This level is called transparent RAID. The second level of management is adaptive RAID, as will be described below.

In transparent RAID, the only configuration information the host/user/system administrator can specify is that an added disk is to be used as a data disk, a parity disk or a spare disk. The disk array uses a disk as a data disk if the type of disk is not defined. The host/user/system administrator can also specify the depth, that is the number of blocks written on a specific disk before writing moves to the next disk.

In transparent RAID, the data blocks on each disk and the parity blocks, if a parity disk is being used, are automatically striped across all of the managed disks in the set. When a new disk is added to an existing set of managed disks, all the data on the existing disks is re-striped across all the disks including the new disk. The blocks on the new disk are also striped across all of the disks in the managed set.

When a disk is added to the set of the managed disks, the space on this disk is immediately available to the host for all operations. After a disk is added to the set of the managed disks the re-striping of data blocks will commence automatically. During this re-striping operation, the data on the existing disks, as well as the data on the new disk, is available to the host for all operations.

During the re-striping operation the overall performance of the disk array may be reduced because of the disk operations required to re-stripe the data. These disk operations for the re-striping operation are done as background operations giving priority to any normal host I/O requests.

If the disk array is shut down during the re-striping operation, all user data is preserved correctly, and when the disk array is rebooted, the re-striping operation will continue from the point where it stopped.

During the process of re-striping it may be necessary to go through multiple transparent RAID transition variations.

Transparent Variations

Transparent RAID supports a number of variations. The variations are used to allow adding and removing disks to/from a managed set of disks, while remaining on-line to the host and preserving all existing data on the set of managed disks, as well as on the disks being added and/or deleted.

The variations supported are:

transparent non-striped, transparent striped, protected transparent non-striped, and protected transparent striped.

Each of these variations are defined in detail in the following text, including how the transitions between the variations are performed.

Transparent Non-Striped

This transparent RAID variation is a direct pass through of data requests, data is not striped, and there is no protection against the loss of a disk, since no parity disk is supported. In essence, this variation treats the disks as totally independent.

Figure 6:
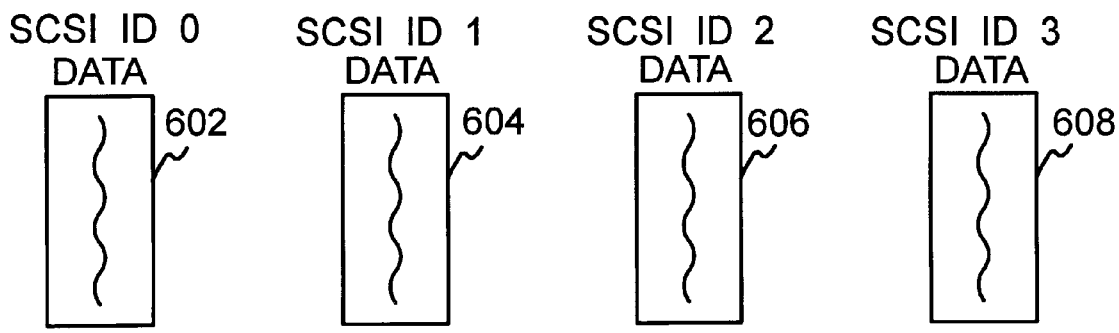
FIGS. 6–9 show the transparent RAID data organization.

FIG. 6 shows four disks 602, 604, 606, and 608 being managed as transparent non-striped, and each disk has its own SCSI id and LUN. Host SCSI requests are passed directly to the managed disks without any id mapping.

Transparent non-striped is one of the base transparent variations used to allow the addition and/or removal of disks. Since there is no striping, the data blocks for each of the data disks are completely contained on the corresponding data disk.

In this variation, when a disk is added to the managed set of disks, it is made immediately available to the host as soon as the disk array completes power up of the disk. In addition, any data that was stored on the added disk is also available to the host.

In this variation the host/user/system administrator can also remove any of the disks from the managed set at any time. Once the disk array is notified to remove a specified disk, the disk array will not respond to any host references to the associated SCSI id and LUN of the removed disk.

Transparent Striped

In this transparent RAID variation, there is no parity data, but the data is striped across all of the managed disks using a depth defined by the host/user/system administrator, or the default depth if none was defined by the host/user/system administrator. To the host, there will still appear to be the same number of SCSI IDs that were present when the disks were directly attached, and each of these disks will have the same number of blocks that were available when the disks were directly attached. This supports load balancing of unprotected data.

Figure 7:
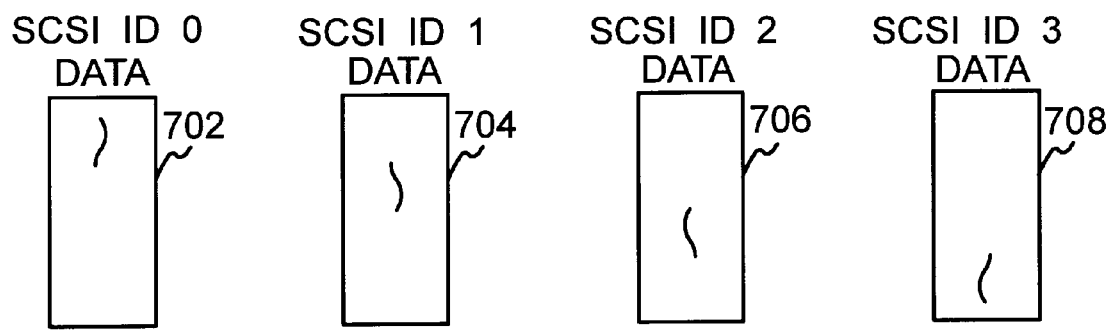

FIG. 7 shows four disks 702, 704, 706, and 708 in a managed set. The array still responds to SCSI IDs 0–3 when the host selects these SCSI IDs, but the data is striped across all four of the disks. For example the curved line in each of the disks 702, 704, 706, and 708, represents that the data that was originally stored on the disks is now striped across all the disks.

The rectangles organization, discussed above, is used for all managed disks in all transparent RAID variations, except for transparent non-striped. The rectangles organization is one which will allow all data blocks to be available even when the disks being managed have varying sizes.

The Squares organization, discussed above, is also used for all managed disks for all the variations except transparent non-striped. The Squares organization fits within the rectangles organization, and allows the data in the managed set of disks to be transposed from a non-striped layout to a striped layout, and vice versa, while remaining on-line, and without requiring any disk space to be removed from use by the host/user.

The main feature of the transparent striped variation is that accesses by the host to a single SCSI id and LUN are distributed across all of the managed disks, thus giving possibly higher levels of throughput and/or response times to the host without making any changes to the host disk driver software.

The main drawback of this variation is that it is not protected and the data for all the managed SCSI IDs and LUNs are striped across all disks. Thus a single lost disk will probably effect the users of all SCSI IDs, instead of just the users who were specifically placed on the lost disk. Additionally, when the lost disk is replaced it will probably be necessary for the data for all of the SCSI IDs, that is all disks, to be restored since all SCSI IDs will be missing the data that was on the lost disk.

Protected Transparent Non-Striped

This transparent RAID variation is used to protect a set of managed disks, that do not have the data blocks presently striped, by using a parity disk. This variation is similar to transparent non-striped except that the user blocks are protected against the loss of a disk. This variation appears to the host computer to be the same as the transparent non-striped configuration when the host/user/system administrator wants to add and/or remove one or more disks from the managed set of disks.

Figure 8:
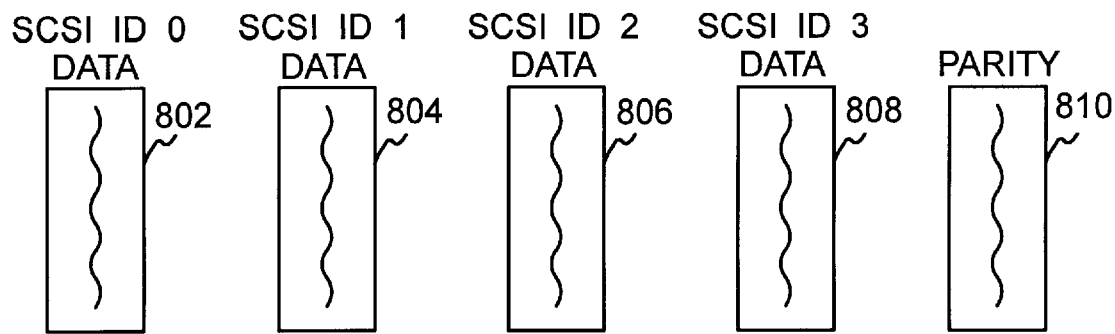

FIG. 8 shows four data disks 802, 804, 806, and 808 that are accessible by the host using the associated SCSI id and LUN supported by the disks. The user data is not striped. The fifth disk 810 is a parity disk and contains parity data built from the other four disks. The parity data is completely contained on the parity disk. This parity data is simply the exclusive OR of all the data on disks 802, 804, 806, and 808, done on a byte by byte basis. For example, the first byte of a block of data on disk 802 is exclusive ORed with the first byte of data of a corresponding block on disks 804, 806, and 808, and the exclusive OR result is placed in the first byte of a corresponding block on disk 810. All other bytes of all other blocks are done the same way, such that all the data on disk 810 is the exclusive OR of all the data on the other disks. This parity data can be used to reconstruct the data on any one of the data disks 802, 804, 806, or 808, in the event that a data disk fails. The method of reconstructing this data is well known to those skilled in the art.

Protected Transparent Striped

This transparent RAID variation is the normal transparent RAID variation that is used by adaptive RAID (described below). This mode has completely striped data as well as completely striped parity data across all the disks in the managed set of disks.

Figure 9:
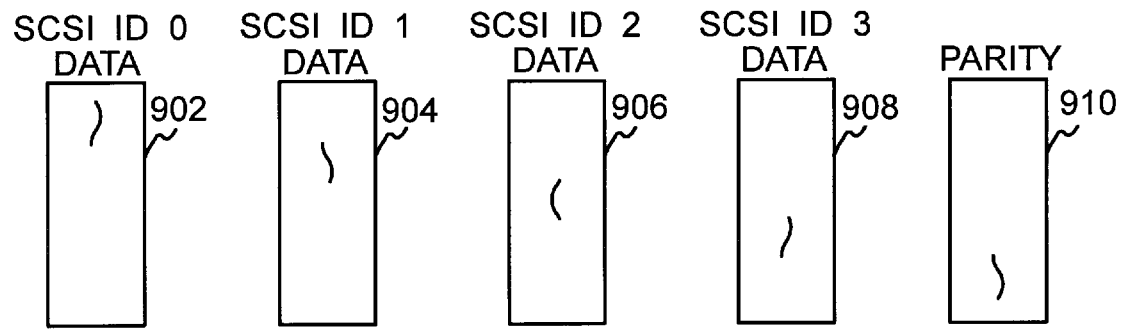

FIG. 9 shows four data disks 902, 904, 906, and 908 that are accessible by the host using the associated SCSI id and LUN supported by the disk. The user data is striped. The fifth disk 910 is defined as the parity disk but it contains striped user data as well as striped parity data.

This is the normal RAID 5 configuration using a set depth that will support the loss of one disk without losing any host data.

Sparing

One or more spares can be specified to be added to support the data in the configuration against loss of one or more disks of user data. When a data disk fails, one of the available spare disks, if there is one available, is automatically chosen and added into the configuration. The blocks in the spare disk are built using data re-generated from the remaining disks in the configuration. While this replacement process is in progress, the configuration has three parts. The first part contains the spare disk with rebuilt data that has replaced the failed disk. The second part contains the blocks that are currently being used to rebuild the data for the spare disk, and this part is locked out to other users while it is being rebuilt. The third part contains the configuration that contains an off-line disk, the failed disk, and requires references to data on the off-line disk to be dynamically generated using the other disks.

If a variation transposition to add or delete disks is in progress when a disk fails, the transposition operation will complete the active square being transposed, so the lock around that square can be removed. Then the transposition is suspended until the sparing operation completes. Once the sparing operation is complete, the transposition operation will continue to completion.

When a broken/missing disk is replaced by an operable disk, the new disk will be treated as the spare and be made available for sparing operations.

Depths

The proper depths to be used are dependent upon the characteristics of the data. Shallow depths cause the read and write operations to cross boundaries, thus involving multiple disks in a single transaction. This crossing causes overall throughput in the system to be impacted, since the system will be able to process fewer concurrent requests. A deep depth will reduce the number of boundary crossings but it has several disadvantages. The first disadvantage is that a deep depth will cause reads or writes with high locality to bottleneck on a single disk. The second disadvantage is that a deep depth tends to eliminate the possibility of doing RAID 3 writes or RAID 3 broken reads as effectively as possible.

One way to determine the appropriate depth is to keep a set of heuristics to detect characteristics that can be used to choose a more appropriate depth. The type of heuristic data needed might be:

1) length of requests—if a particular length was predominant, pick a depth that corresponds well to the request length.
2) boundaries of requests—if the requests are of a particular length, and they fall on particular boundaries, such as multiples of some number, that number can be used for the depth.
3) break statistics into a small number of sets to allow for more than one set of length and boundaries.

Also, in order to support the squares format, depth must be limited to a reasonable size that will allow the transposition of a square in a short period of time, typically milliseconds or less. Blocks in a square cannot be locked out from a host for a long period of time, such as seconds, or performance may be unacceptable.

To operate efficiently and effectively in accessing, updating, and protecting the host data, the system normally operates in either the transparent striped or protected transparent striped variations. However, before adding or deleting disks, the system must be operating in either the transparent non-striped or protected transparent non-striped variation. Therefore, the system must transit between the different variations.

Figure 10:
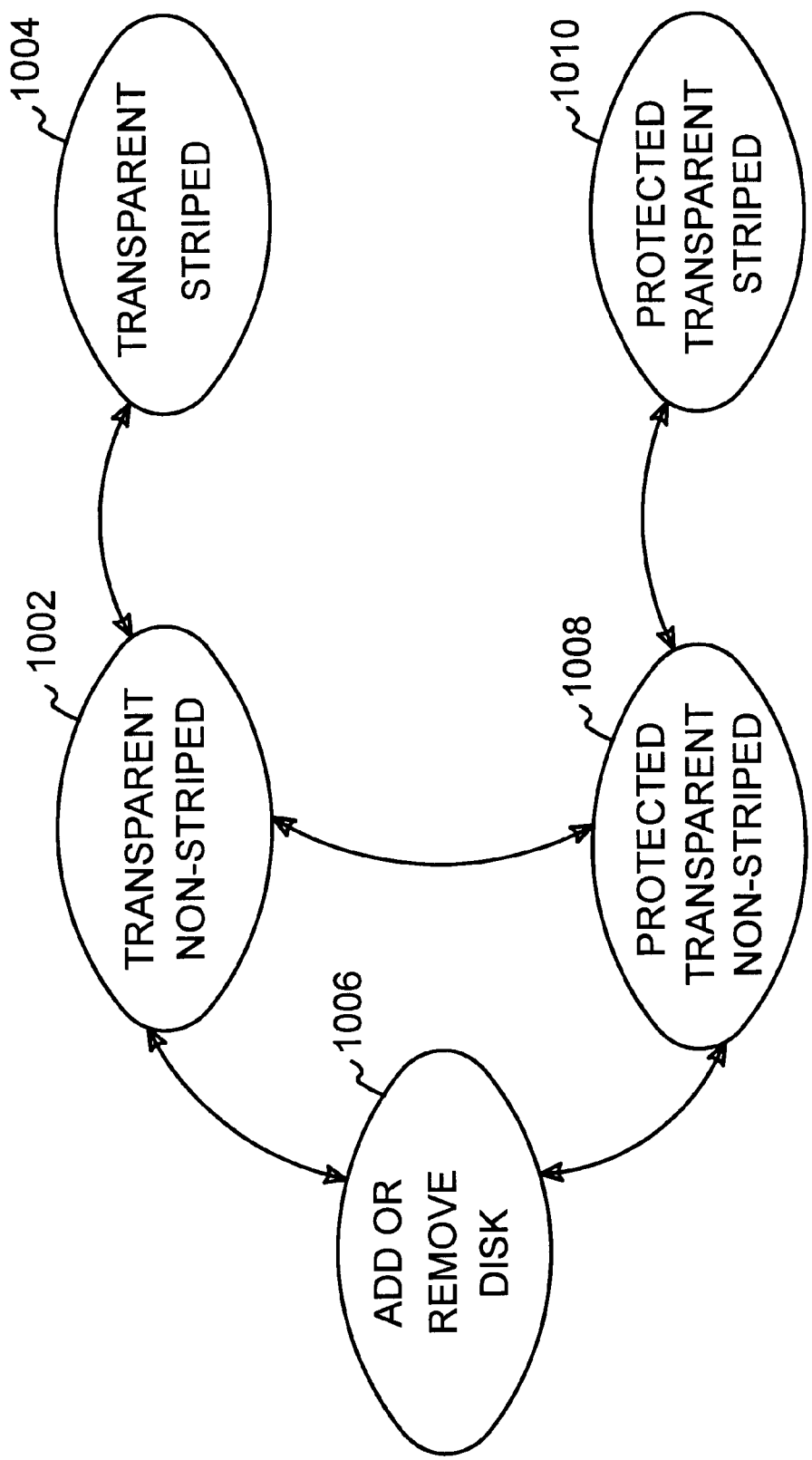
FIG. 10 shows a state diagram of the transitions that are performed by transparent RAID.

FIG. 10 shows which transitions between transparent RAID variations can be performed. Referring now to FIG. 10, the transparent non-striped variation 1002 exists when the disks are first placed under management of the array. From this variation, a new disk can be added or removed, as shown by circle 1006. Also from the transparent non-striped variation 1002, the data can be striped over the disks being managed to move to the transparent striped variation 1004.

Also from the transparent non-striped variation 1002, a parity disk can be added, and parity accumulated, to cause a transition to the protected non-striped variation 1008. From the protected non-striped variation 1008, the data can be striped across the disks for transition to the protected transparent striped variation 1010.

As FIG. 10 shows, the system cannot move directly between the transparent striped variation 1004 and the protected transparent striped variation 1010. If this type of transition is required, the system must move through variations 1002 and 1008 to complete the transition.

Figure 11:
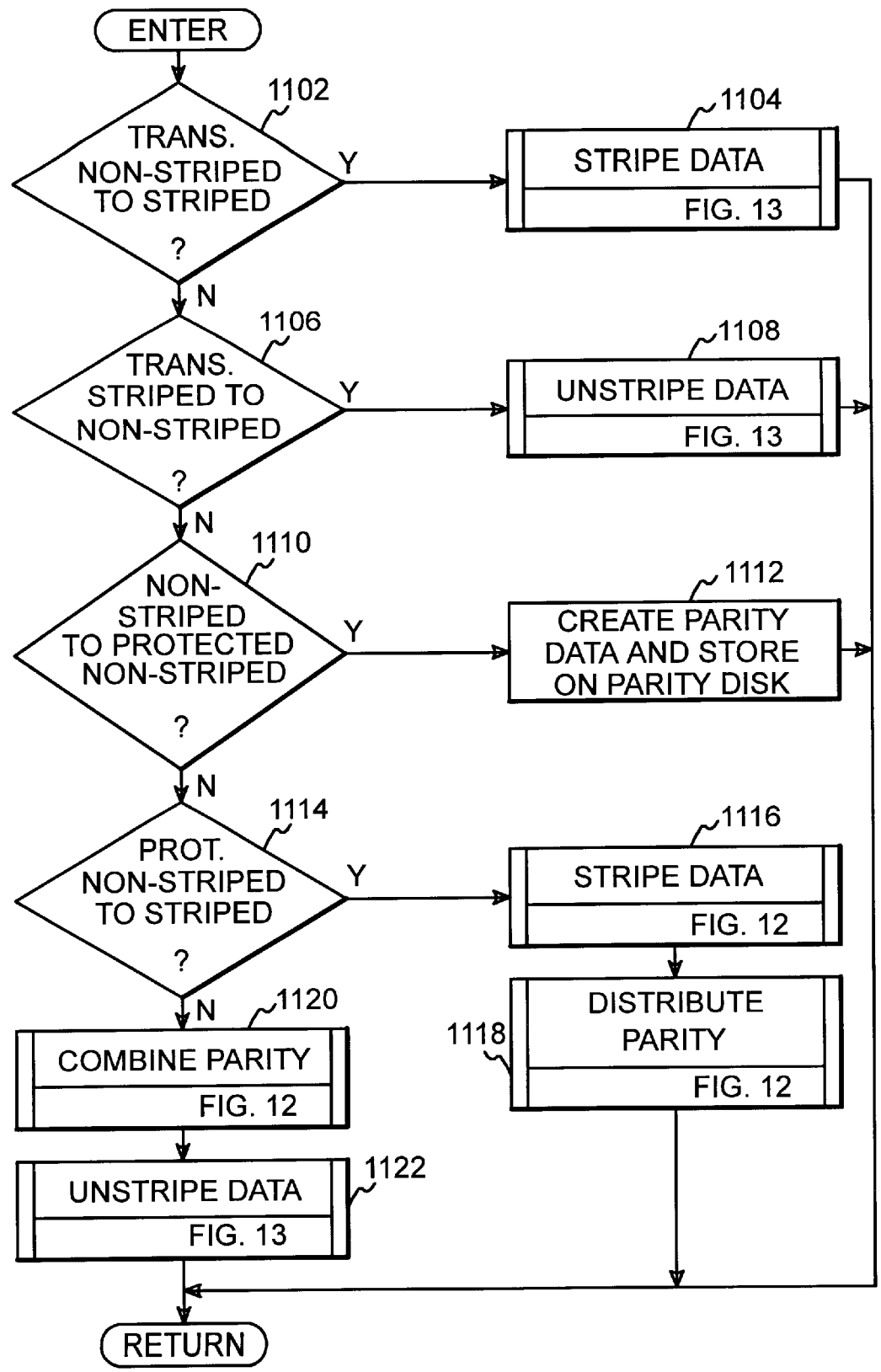
FIG. 11 shows a flowchart of the process of transposing data to accomplish the transitions described in FIG. 10.

FIG. 11 shows a flowchart of the process of transposing the data to accomplish the transitions as described in FIG. 10. FIG. 11 is called by the process of FIG. 10 whenever the system needs to change the transparent RAID variation. Referring now to FIG. 11, after entry, step 1102 determines if the requested transition is between the transparent non-striped variation and the transparent striped variation. If so, step 1102 transfers to step 1104 which calls the process of FIG. 13 to stripe the data on the disks. After striping all the data, control returns to the caller of FIG. 11. As described above, data in the last, partial portion of the disk will not be striped.

Step 1106 determines if the transposition is between the transparent striped variation and the transparent non-striped variation. If so, step 1106 transfers to step 1108 which calls the process of FIG. 13 to un-stripe the data on the disks. After un-striping all the data, control returns to the caller of FIG. 11.

Step 1110 determines whether the transposition is between transparent non-striped to protected transparent non-striped. If so, step 1110 goes to step 1112 which exclusive ORs the data within blocks, as described above, to create parity data and store this data on the parity disk. Step 1112 then returns to the caller.

Step 1114 determines whether the transposition is between protected transparent non-striped and protected transparent striped. If so, control goes to step 1116 which calls the process of FIG. 13 to stripe the data across the data disks. Step 1118 then calls the process of FIG. 12 to distribute parity over all the disks. Control then returns to the caller.

Figure 12:
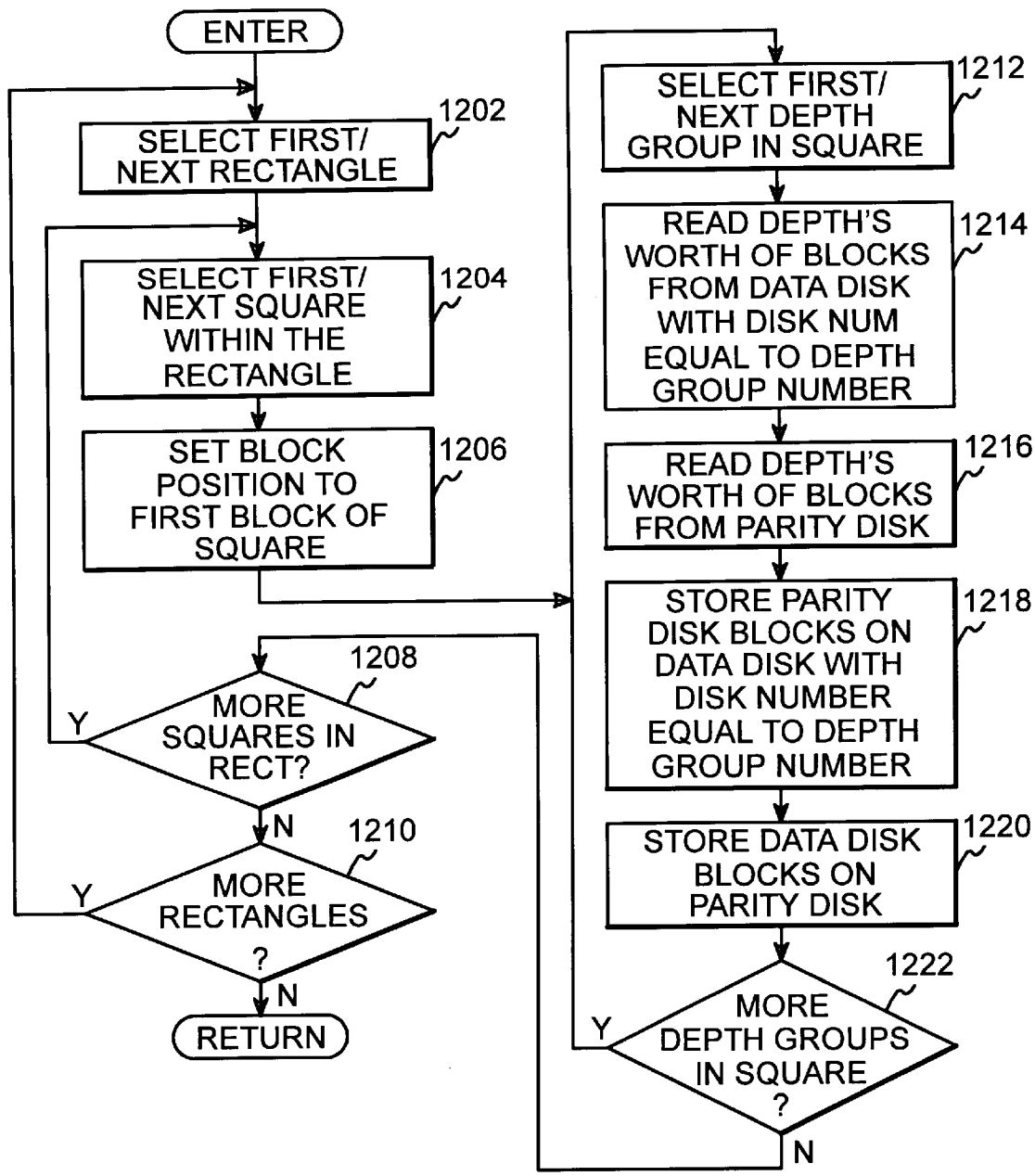
FIG. 12 shows a flowchart of the process for distributing or combining parity data.

If the transposition is from protected transparent striped to protected transparent non-striped, step 1114 goes to step 1120 which calls the process of FIG. 12, once for each square, to combine the parity data onto the parity disk. Step 1122 then calls the process of FIG. 12, once for each square, to unstripe the data. Control then returns to the caller.

FIG. 12 shows a flowchart of the process for distributing or combining parity data over the managed disks. Referring now to FIG. 12, after entry, step 1202 selects the first or next rectangle. Step 1204 then selects the first or next square within the selected rectangle. Step 1206 positions a block position pointer to the first block in the square. All operations of steps 1212 through 1222 are done relative to the block position pointer.

Step 1212 selects the first, or next, depth group within the square. A depth group is the number of blocks in the depth, over the set of managed disks.

Step 1214 then reads the number of blocks equal to the depth from the disk having the same number as the depth group. For example, if the depth were two, and if the second depth group is being processed, step 1214 would read two blocks from the second disk.

Step 1216 then reads the number of blocks equal to the depth from the parity disk. Step 1218 then writes the parity disk data to the data disk, and step 1220 writes the data disk data to the parity disk. Step 1222 determines if there are more depth groups in the square, and if so, step 1222 returns to step 1212 to process the next depth group.

After all depth groups in the square are processed, step 1222 goes to step 1208 which determines whether there are more squares in the rectangle to process. If there are more squares to process, step 1208 goes to step 1204 to process the next square.

After all squares in the rectangle are processed, step 1208 goes to step 1210 which determines whether all rectangles within the managed disks have been processed. If there are more rectangles to process, step 1210 goes to step 1202 to process the next rectangle.

After all rectangles have been processed, step 1210 returns to its caller.

Figure 14:
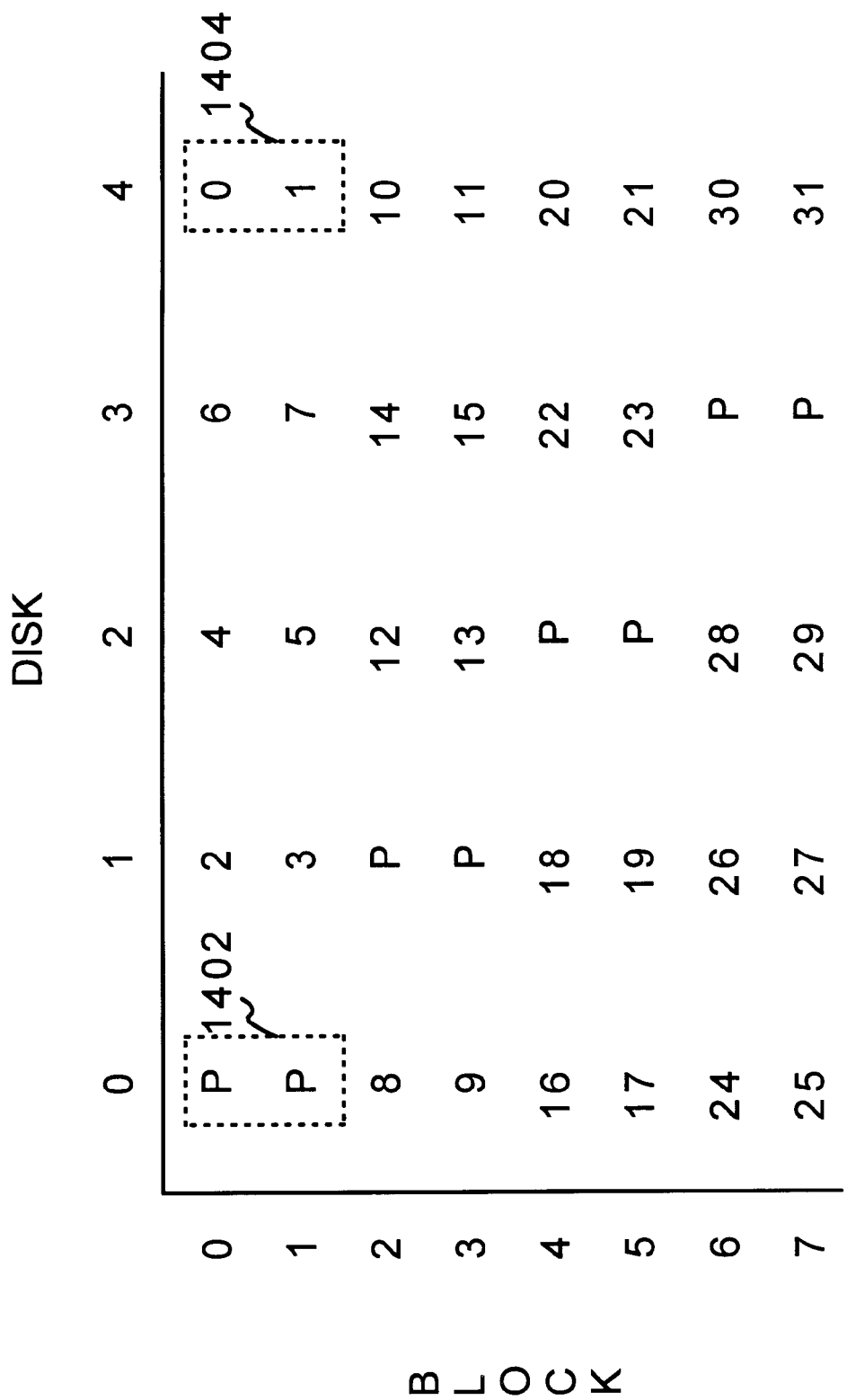
Figure 15:
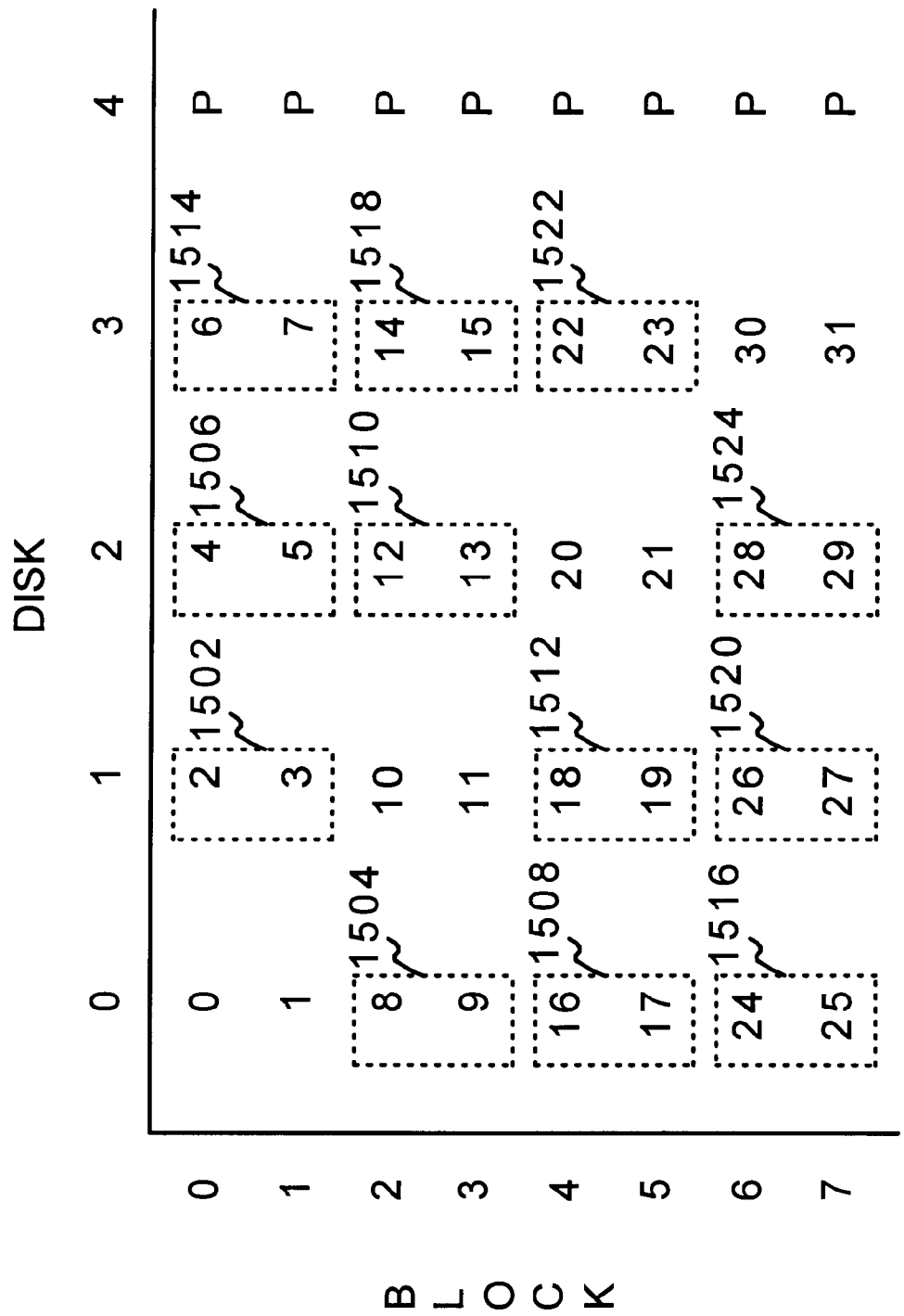

FIGS. 14 and 15 show an example of the process of combining parity. The process of FIG. 12 is also followed for distributing parity.

Figure 13A:
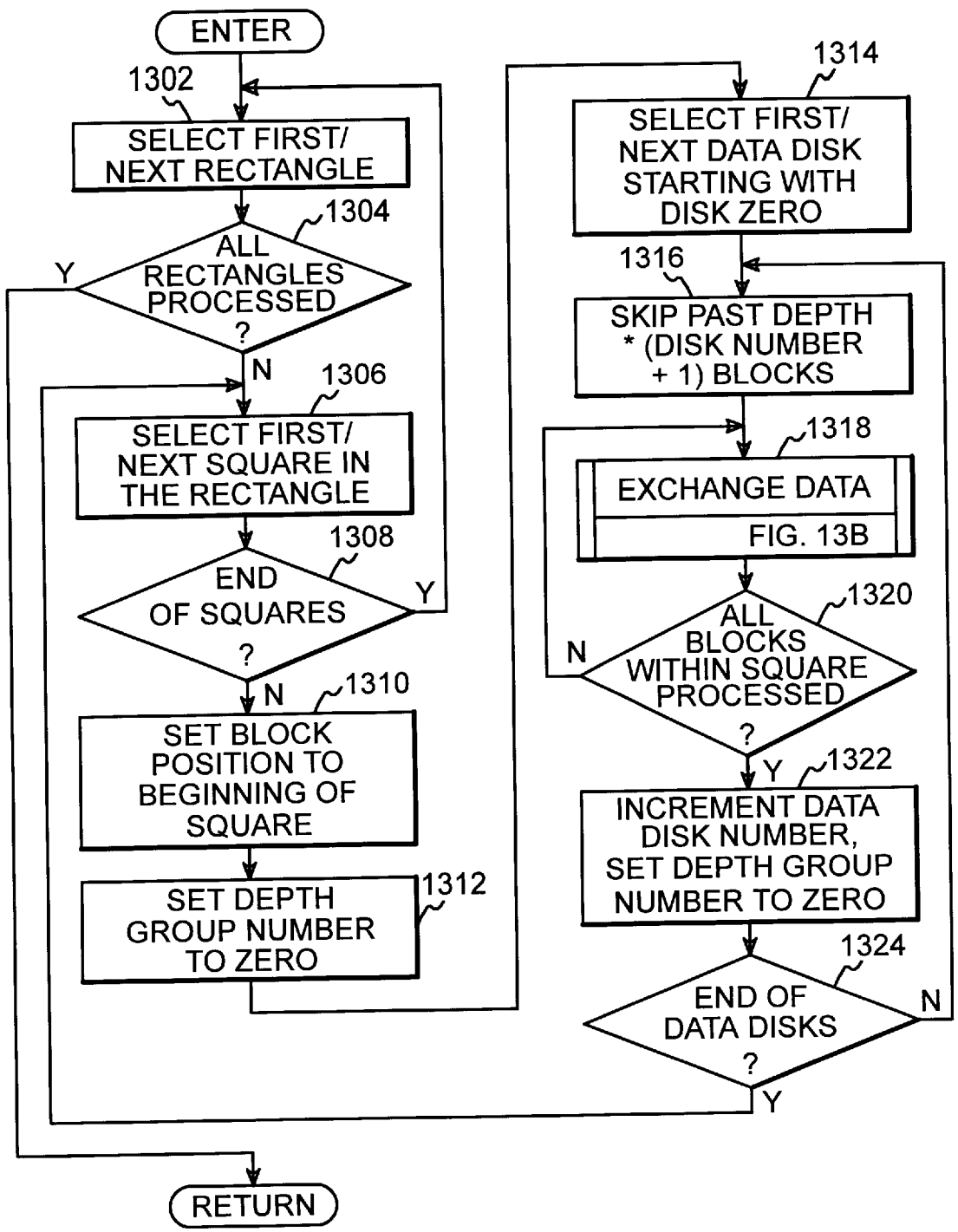
FIGS. 13A and 13B show a flowchart of the process of striping or un-striping data.
Figure 13B:
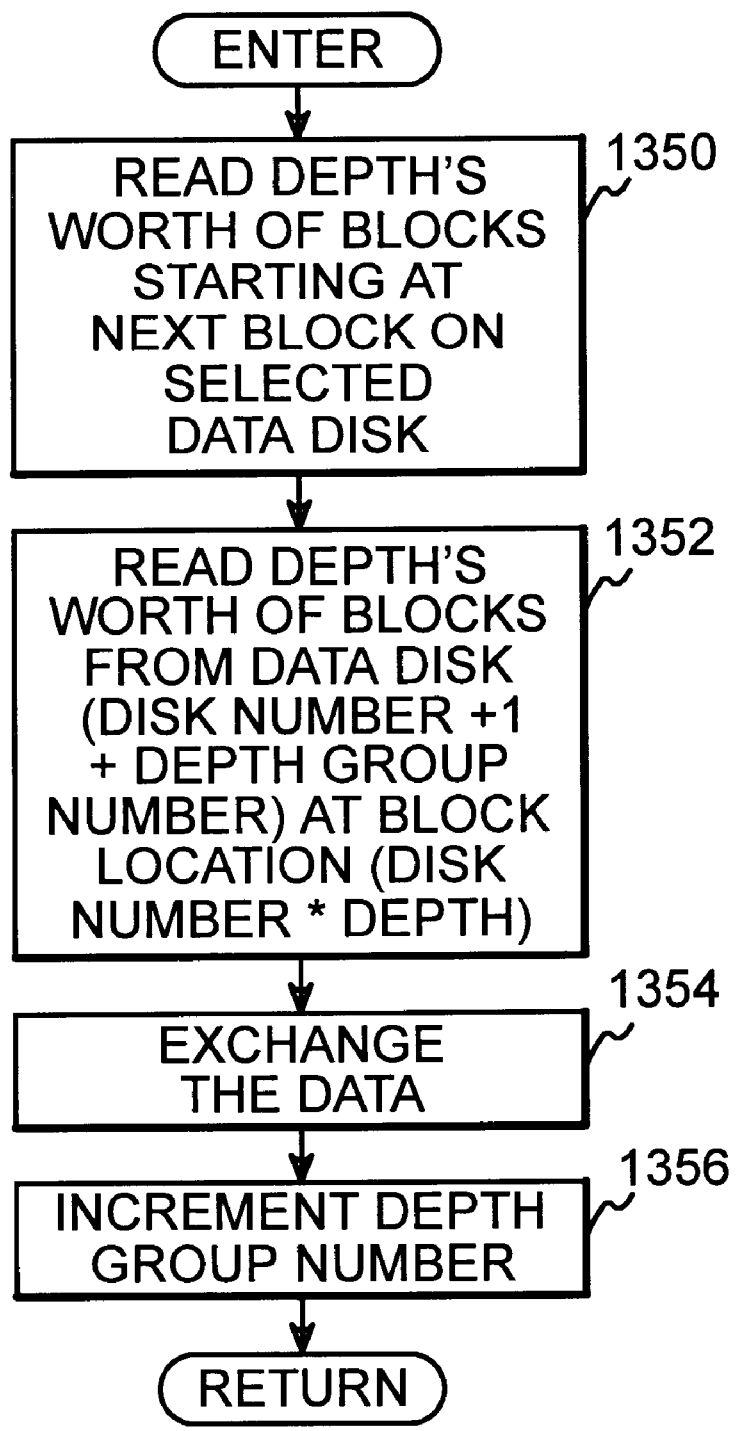

FIGS. 13A and 13B show a flowchart of the process of striping or un-striping data within the system. Referring now to FIG. 13A, after entry, step 1302 selects the first or next rectangle. Step 1304 then determines if all rectangles have been processed, and returns if they have.

If any rectangles remain, step 1304 goes to step 1306 which selects the first or next square within the rectangle selected in step 1302. Step 1306 determines if all squares within this rectangle have been processed, and if they have, step 1308 goes to step 1302 to get the next square in the selected rectangle.

If all squares have not been processed, step 1310 sets a block position to the first block in the square. The block position is used in all square processing as the origin of the block, so that all other block selections within the block are relative to the block.

Step 1312 sets the depth group number to zero, and step 1314 selects the first or next data disk starting with data disk zero. Step 1316 skips past a number of blocks to position at the block equal to the depth times the data disk number +1. This block is the first block to be exchanged.

Step 1318 calls FIG. 13B to exchange data at this location, and then step 1320 determines if all the blocks on this data disk, for the entire square, have been processed. If not, step 1320 returns to step 1318 to continue processing this data disk within the square.

After all the blocks on this data disk within the square have been processed, step 1320 goes to step 1322 which increments the data disk number, and also sets the depth group number back to zero. Step 1324 then determines if all data disks within the square have been processed, and if not, returns to step 1316 to process the next data disk within the square.

After all data disks in the square have been processed, step 1324 returns to step 1306 to process the next square.

FIG. 13B shows the process of exchanging data within a square. Referring to FIG. 13B, after entry, step 1350 reads a depth's worth of blocks (i.e. a number of blocks equal to the depth), at the location defined initially by step 1316. Then step 1316 skips past the number of blocks it reads to leave the pointer at the next block after those already read, in preparation for the next pass through this block.

Step 1352 then reads a depth's worth of blocks from the data disk that has a number equal to the data disk selected in step 1314 plus one plus the depth group number. On this disk, the blocks are read from the location computed by multiplying the disk number (from step 1314) by the depth.

Step 1354 then exchanges these two depth's worth of blocks, and step 1356 increments the depth group number before returning to FIG. 13A.

FIGS. 14, 15, and 16 show the data organization of a square of data, and illustrate how this data moves during the transposition between some of the variations. In the example of FIGS. 14, 15, and 16, the depth is equal to two, there are four data disks, and one parity disk. Also, in this example, the data blocks are numbered, while the parity blocks for each depth group are represented by the letter "P".

FIG. 14 shows an example of how data is stored in a square within the protected transparent striped variation. Specifically, FIG. 14 illustrates striped data and distributed parity.

Applying the flowchart of FIG. 12 to the data organization of FIG. 14 results in the data organization shown in FIG. 15, which shows striped data and combined parity. In this example, the depth's worth of blocks outlined by the dotted lines 1402 and 1404 are exchanged using the process of FIG. 12. Similarly, the other parity data is exchanged with the non-parity data resulting in the example of FIG. 15, which shows combined parity data within the square.

The process of FIG. 12, as shown above being applied to FIG. 14 to produce FIG. 15, results in exchanging data in data blocks of the parity device with data in data blocks of a square portion, comprising numbering the stripes within each square portion and numbering each storage device, and for each stripe within a square portion, exchanging a set of data blocks of the parity device with a set of data blocks in the stripe on a device having a number equal to a number of the stripe.

Applying the flowchart of FIGS. 13A and 13B to the data organization of FIG. 15 results in the data organization shown in FIG. 16, which shows un-striped data and combined parity. For example, the depth's worth of blocks outlined by the dotted lines 1502 and 1504 are exchanged, as are the depth's worth of blocks outlined by the dotted lines 1506 and 1508. Similarly, blocks outlined by 1510 and 1512 are exchanged, blocks outlined by 1514 and 1516 are exchanged, the blocks outlined by 1518 and 1520 are exchanged, and the blocks outlined by 1522 and 1524 are exchanged to provide the data organization of FIG. 16, which is non-striped and combined parity.

The process of FIGS. 13A and 13B, as shown above being applied to FIG. 15 to produce FIG. 16, results in exchanging data in the sets of blocks of each of the plurality of square portions comprising the steps of selecting a square portion, locating a diagonal set of blocks within the selected square portion, wherein the diagonal set of blocks starts at a first set of blocks in a first stripe of the selected square portion and the diagonal set of blocks ends at a last set of blocks in a last stripe of the selected square portion, and exchanging all sets of blocks equidistant from the diagonal set of blocks, on opposite sides of the diagonal set of blocks, and in a line perpendicular to the diagonal set of blocks.

Add A Disk

When the host/user/system administrator requests that the disk array add one or more disks to the set of managed disks, the system must change the managed disks to a particular transparent variation, as discussed above with respect to FIG. 10. A request to add one or more disks by the host/user/system administrator will be delayed any time there is already a transition operation in progress, or any time there is a sparing operation in progress.

If a disk is to be added while in the protected transparent striped variation, the new disk is first added to the set of managed disks as a transparent non-striped disk. This makes it immediately accessible to the host, unless it is to be added as a parity disk. If the disk already contains user data, this data is also immediately available to the host, and the data will be striped along with the other data on the other disks.

Figure 17:
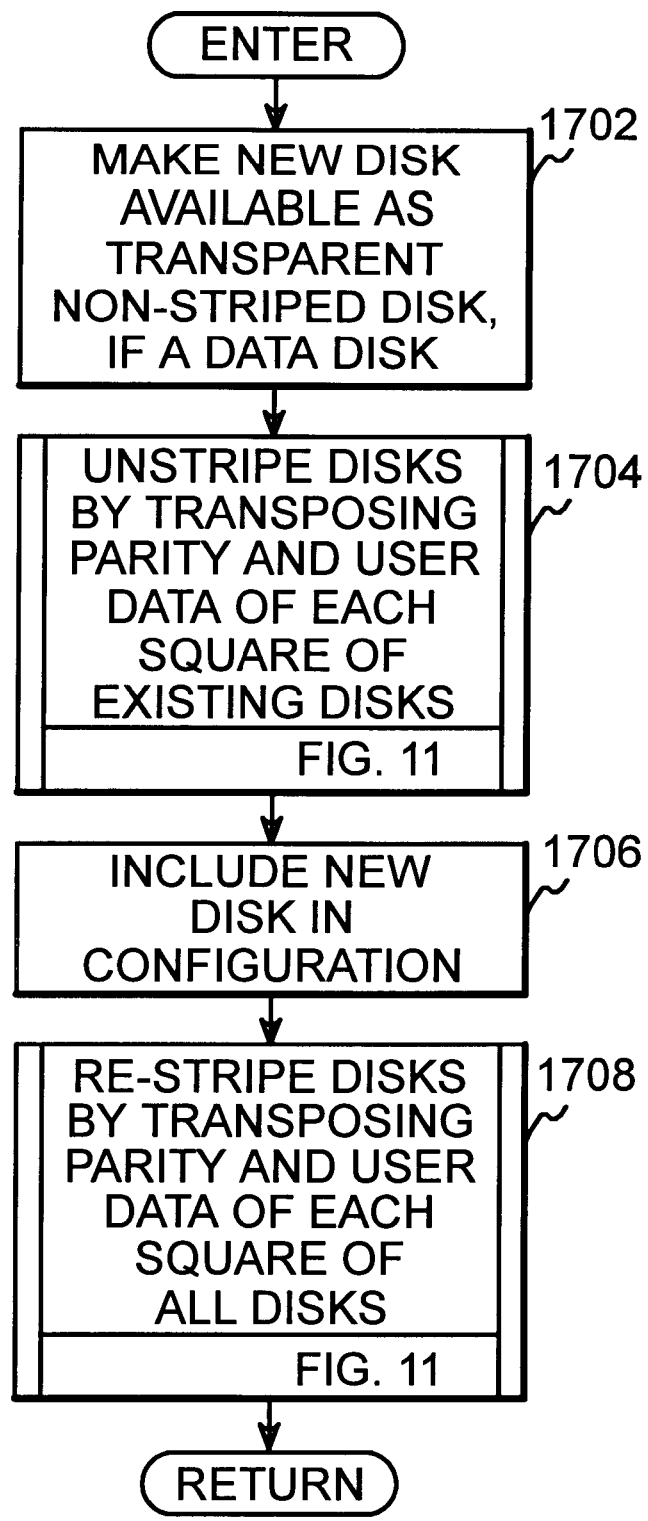
FIG. 17 shows a flowchart of the process of adding a disk to the array.

FIG. 17 shows a flowchart of the add disk process. Referring to FIG. 17, after entry, step 1702 makes the new disk available to the host computer, as a transparent non-striped disk, if the disk is to be a data disk. Step 1704 then unstripes the existing disks, by calling FIG. 11, to transpose the parity blocks and then transpose the user data blocks for each square on the existing disks. Step 1706 then includes the new disk in the configuration, and step 1708 calls FIG. 11 to transpose the data and parity on the disks, including the new disk, in order to re-stripe the disks.

As the transition proceeds, the variation will be altered to reflect the changes to the data layout on the managed disks. That is, once a square has been transposed, its variation is changed to reflect its new organization, either un-striped or striped, protected or non-protected, depending upon the particular transposition in progress. Thus, during the transition, the system manages the disks as partially striped, partially un-striped, protected or not protected, as the transposition is completed. This allows the data to be available during the transposition, and only the data in a square currently being transposed is not available, and this data is only not available during the short time that the transposition of the square is in progress.

If a shutdown is requested during the transition, the transposition of the active square will complete before the shutdown will be honored.

If the new disk being added is a parity disk, it is not made available to the host, since parity disks are not ordinarily available to the host computer. The system will unstripe the existing disks, and stripe the new set of disks and regenerate parity, to include the parity disk.

If the existing disks did not have parity, that is, they were a transparent striped variation, the process proceeds as in FIG. 17, except that there is no parity to transpose.

Remove A Disk

When the host/user/system administrator requests that the disk array remove one or more disks from the set of managed disks, the system must change the managed disks to a particular transparent variation, as discussed above with respect to FIG. 10. A request to remove one or more disks by the host/user/system administrator will be delayed any time there is already a transition operation or sparing operation in progress.

Figure 18:
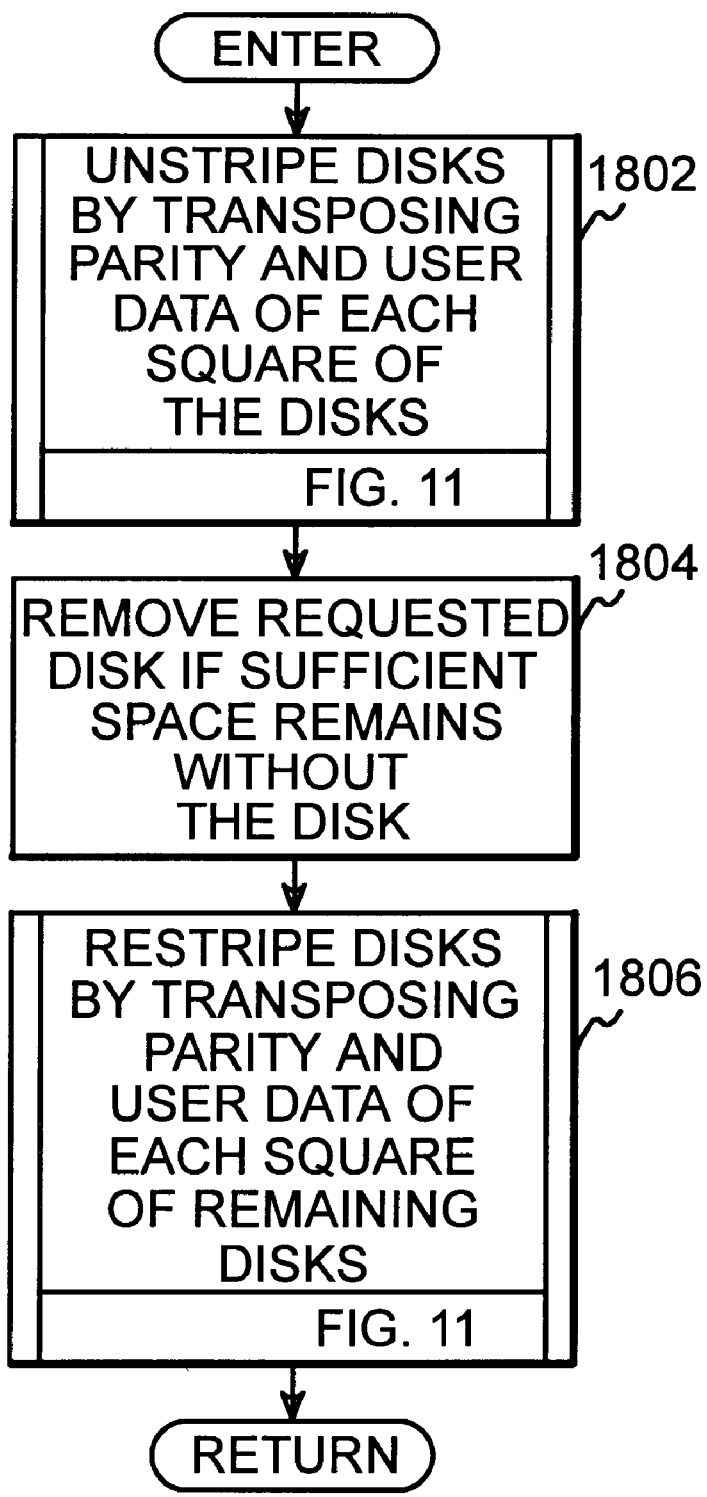
FIG. 18 shows a flowchart of the process of removing a disk from the array.

FIG. 18 shows a flowchart of the remove disk process. Referring to FIG. 18, after entry, step 1802 unstripes the existing disks, by calling FIG. 11, to transpose the parity blocks and then to transpose the user data blocks for each square on the existing disks. Step 1804 then removes the disk from the set of managed disks. Step 1806 then calls FIG. 11 to transpose the data and parity on the remaining disks in order to re-stripe the disks.

As the transition proceeds, the variation will be altered to reflect the changes to the data layout on the managed disks. That is, once a square has been transposed, its variation is changed to reflect its new organization, either un-striped or striped, depending upon the particular transposition in progress. Thus, during the transition, the system manages the disks as partially striped and partially un-striped, as the transposition is completed. This allows the data to be available during the transposition, and only the data in a square being transposed is not available, and this data is only not available during the short time that the transposition of the square is in progress.

If a shutdown is requested during the transition, the transposition of the active square will complete before the shutdown will be honored.

If the new disk being removed is a parity disk, the system will un-stripe the existing disks, and stripe the remaining disks without parity.

If the existing disks did not have parity, that is, they were a transparent striped variation, the process proceeds as in FIG. 18, except that there is no parity to transpose.

Adaptive RAID

The second level of management is called adaptive RAID. Adaptive RAID is built on top of transparent RAID, specifically the protected transparent striped variation.

Adaptive RAID requires configuration information from the host/user/system administrator. Using adaptive RAID, the set of managed disks will appear to the host/user/system administrator as a collection of blocks. The host/user/system administrator defines a set of SCSI IDs that have a specified number of blocks associated with each id. The host/user/system administrator no longer has a view into the way the blocks on the managed disks are organized or managed.

Adaptive RAID does not deal with adding and removing disks from the set of managed disks. Instead, when a host/user/system administrator requests that a disk be added or removed from the set of managed disks in the disk array, adaptive RAID is turned off, and the system reverts to the protected transparent striped variation of transparent RAID. Once the transition is made to the protected transparent striped variation, disks can be added and/or removed as defined above.

When using adaptive RAID, a data disk can only be removed if there is enough disk space available, minus the space of the disk being removed. If there is not enough space, the operation will be rejected. Also, a parity disk cannot be removed while adaptive RAID is in use.

In adaptive RAID, each disk is treated as a set of linked groups of blocks. Initially, there is a single group of blocks comprising all the blocks in the disks. This group is called the block pool. The allocation of a block group, defined below, is taken from the block pool.

Figure 19:
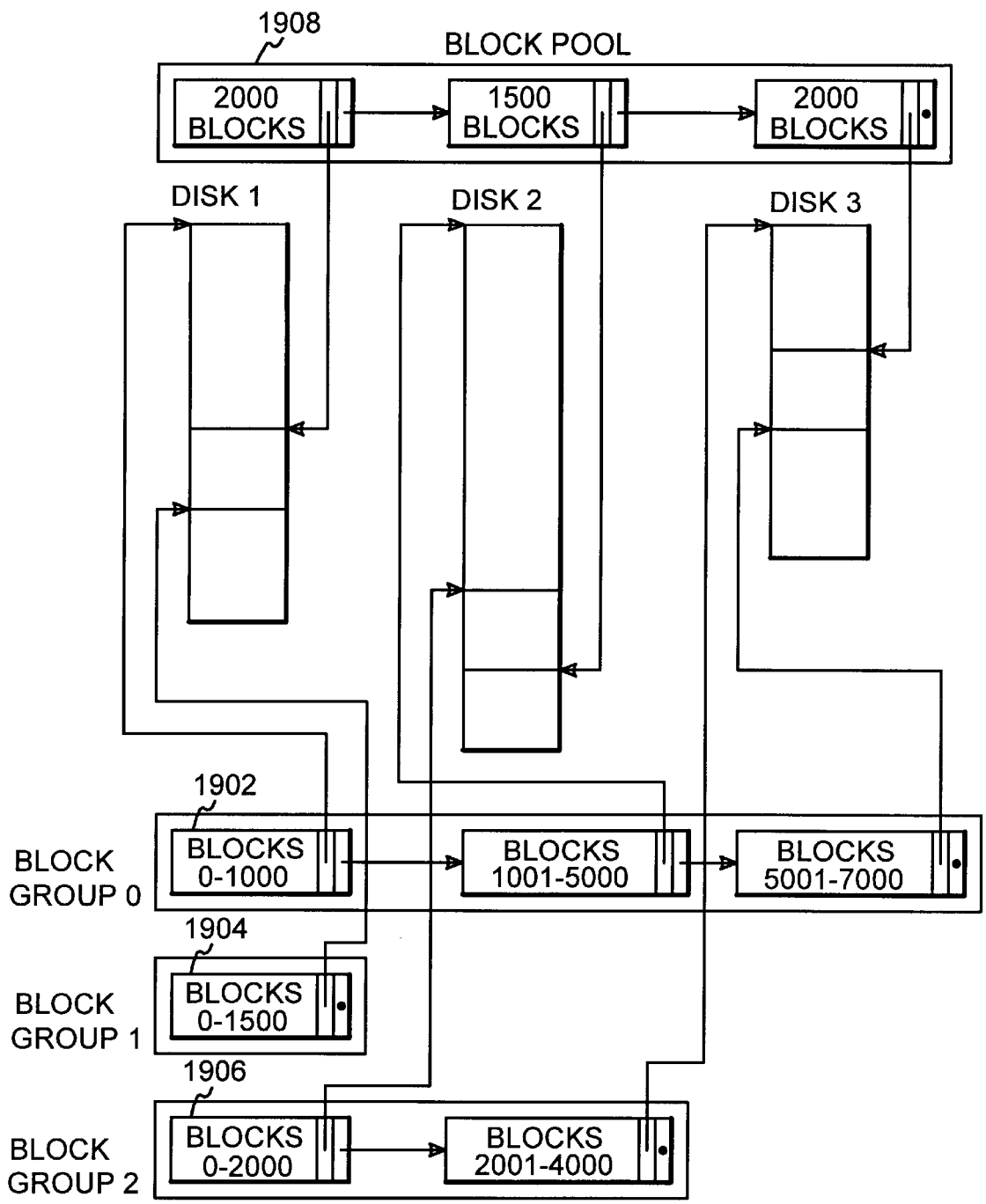
FIG. 19 shows an example of the allocation of blocks.

FIG. 19 shows an example of the allocation of blocks. Referring to FIG. 19, three block groups 1902, 1904, and 1906 are shown as linked lists of blocks. A linked list 1908 contains the remaining available blocks, called the block pool. When a read or write request is received, adaptive RAID mapping data structures are used to map the blocks requested by the host into the blocks managed by the transparent RAID. Since all transitions are managed at the transparent RAID level, the adaptive RAID mapping interface to the host interface works regardless of whether the adaptive RAID features are turned on or off.

The structures that support adaptive RAID are always built on a protected transparent striped variation. This variation is the middle ground between the adaptive RAID structures and the variations that allow for disks to be added and removed from the set of managed disks. Any time a disk needs to be added or removed from the set of managed disks, adaptive RAID is turned off and the portions that have been used to expand the configuration beyond transparent RAID will be collapsed back into a normal protected transparent striped variation. While this change is in progress the set of managed disks will remain on-line and accessible by the host. The only effect of turning off the adaptive RAID features is that performance may be impacted because the array will only be supporting normal RAID operations.

Once the additional adaptive RAID portions in the configuration have been collapsed back to a normal protected transparent variation, the striping will be removed by transposing into a protected transparent non-striped variation. After this transposition is complete, the disks are added and/or removed. After all outstanding additions and deletions of disks are completed, the process is reversed, and the disk array will again support the adaptive RAID features.

Transparent RAID allows the management of a disk array to provide load balancing (RAID 0) and/or protected data (RAID 5). Providing adaptive RAID requires configuration information from the host, at a simple level. The host must specify a set of one or more block groups. A user specified block group comprises:

an id to be used by the host for communicating with the disk array. For SCSI interfaces this is a SCSI id and a LUN.

the number of blocks to be assigned/allocated to each block group. These blocks are logically numbered from 0 to n−1 where n is the total number of blocks allocated.

an indication of whether or not the blocks are to be protected.

an indication of whether or not to initialize the user data blocks to a value of binary zero.

These block groups can be added, deleted or modified at anytime by the host while the disk array is on-line. All existing block groups continue to be on-line and accessible during block group changes.

When a new disk is added to the disk array, the blocks on the added disk are added to the block pool list 1908 within the disk array. As the host defines and adds a new block group, the space for the new block group is taken from the available blocks and reserved for the new block group. The total space specified by the defined block groups includes the parity space needed to provide RAID 5 operations for all protected block groups. The blocks left over from the allocated block groups are used as a block pool to manage adaptive RAID features. Any time the block pool is exhausted, for example because of a high number of host requests, the disk array will revert to transparent RAID operations, so the host must leave an adequate amount of unallocated space for the block pool. The amount of space necessary depends upon the access rate.

Figure 20:
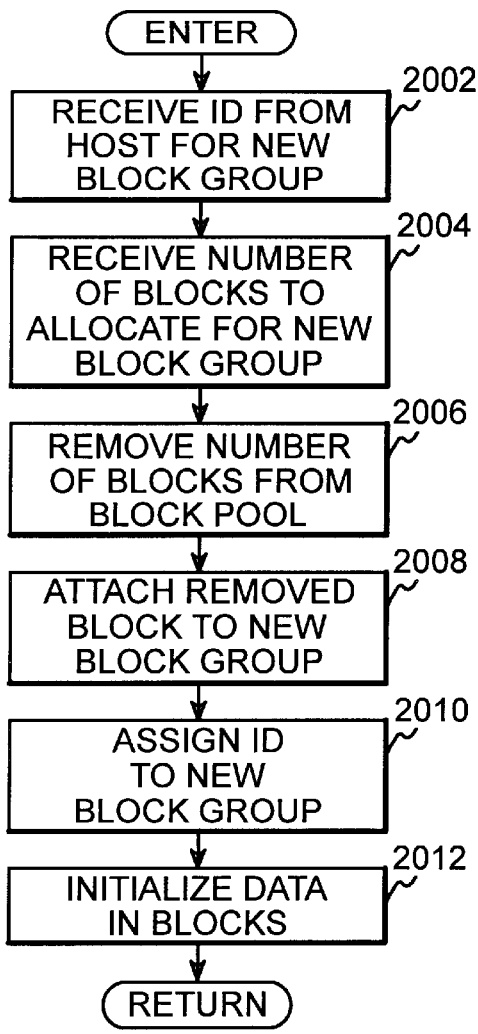
FIG. 20 shows a flowchart of the process of creating (adding) a new block group.

FIG. 20 shows a flowchart of the process of creating a new block group. Referring to FIG. 20, after entry, step 2002 receives an id from the host to use for the new block group. Step 2004 receives the number of blocks to allocate to the new block group from the host. Step 2006 removes the number of blocks defined in step 2004 from the block pool and step 2008 connects these blocks to the new block group. Step 2010 then assigns the id received in step 2002 to the new block group, and if initialization has been requested, step 2012 initializes them to binary zero. The host must perform any other desired initialization.

Figure 21:
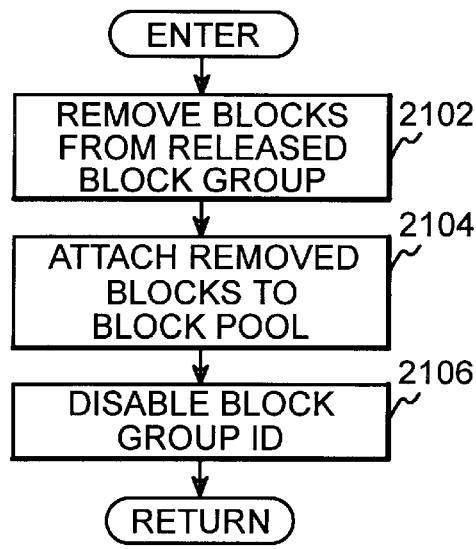
FIG. 21 shows a flowchart of the process of removing a block group.

FIG. 21 shows a flowchart of the process of removing a block group. Referring to FIG. 21, when an existing block group is released by the host, step 2102 removes the blocks from the block group, and step 2104 places all the block space removed from the block group into to the block pool. Step 2106 disables the block group id so that the disk array will stop responding to the block group id.

The host specified features of an existing block group can also be changed dynamically. If the size of the block group is increased, the additional blocks are allocated from the block pool and added to the end of the block group's list. The additional blocks will be initialized to zeros, if requested, and the additional blocks will have valid parity if the block group is protected. If the size of the block group is decreased, the specified number of blocks are removed from the end of the block group, and added to the block pool.

The protected state of the block group can be changed, from protected to unprotected or vice versa, in the same manner as transparent RAID. Although this can be a long running operation, depending on the size of the block group, the block group is accessible to other requests while the protected state change is in progress.

Operation of Adaptive RAID

The block pool entries are used in two major ways:

1) When a small write operation is made, a block pool of some minimum size is allocated and given a squares portion that is linked into the appropriate location in the squares portions lists. This block pool entry will be defined using a RAID 1 configuration. This block pool entry will likely be wider than 2 disks. This squares portion is treated specially to allow multiple groups of RAID 1 entries to be created and used.

2) When a larger write operation is made, a block pool entry is allocated and used to provide RAID 3 write operations. The parity data for this block pool entry is not striped, instead, it is always written to the parity disk.

As data areas in normally striped squares portions are replaced by block pool entries, the entire square may be replaced and added to the block pool using a new block pool entry.

The usage of the block pool depends on the write operation being performed:

1) Small random writes (less than one depth's worth)—These writes are mapped into RAID 1 block pools. This allows the write to be done without a write penalty. These block pool allocations are ultimately written to their original blocks using a RAID 5 write, during background processing.

2) Small sequential writes (less than one depth's worth)—These writes are mapped into RAID 1 block pools. The block pool allocations are done with extra blocks allocated so that new sequential writes will not immediately require an additional block pool allocation.

3) Medium writes (random or sequential is not important)—A medium write is one that is large enough to span the disks being managed with a shallow depth. The blocks used are allocated from the block pool and the write operation is performed as a RAID 3 write. Since this is an allocated set of blocks that can start at any logical block, there is never an initial partial square and the ending partial square can have old data, since parity is generated before writing the set of blocks. The trailing partial portion will be wasted space, since there is no way to write it later without a write penalty.

4) Large writes (random or sequential is not important)—A large write is one that is large enough to span all the disks being managed at the depth used in the normal square. This type of write can be done without using the block pool since this type of write can write to the regular square blocks as a RAID 3 write. This type of write can have a partial RAID 3 span in the front and the end. The front partial span is handled as a normal small or medium random write. The trailing partial RAID 3 span is also treated as a small or medium random write.

Figure 22:
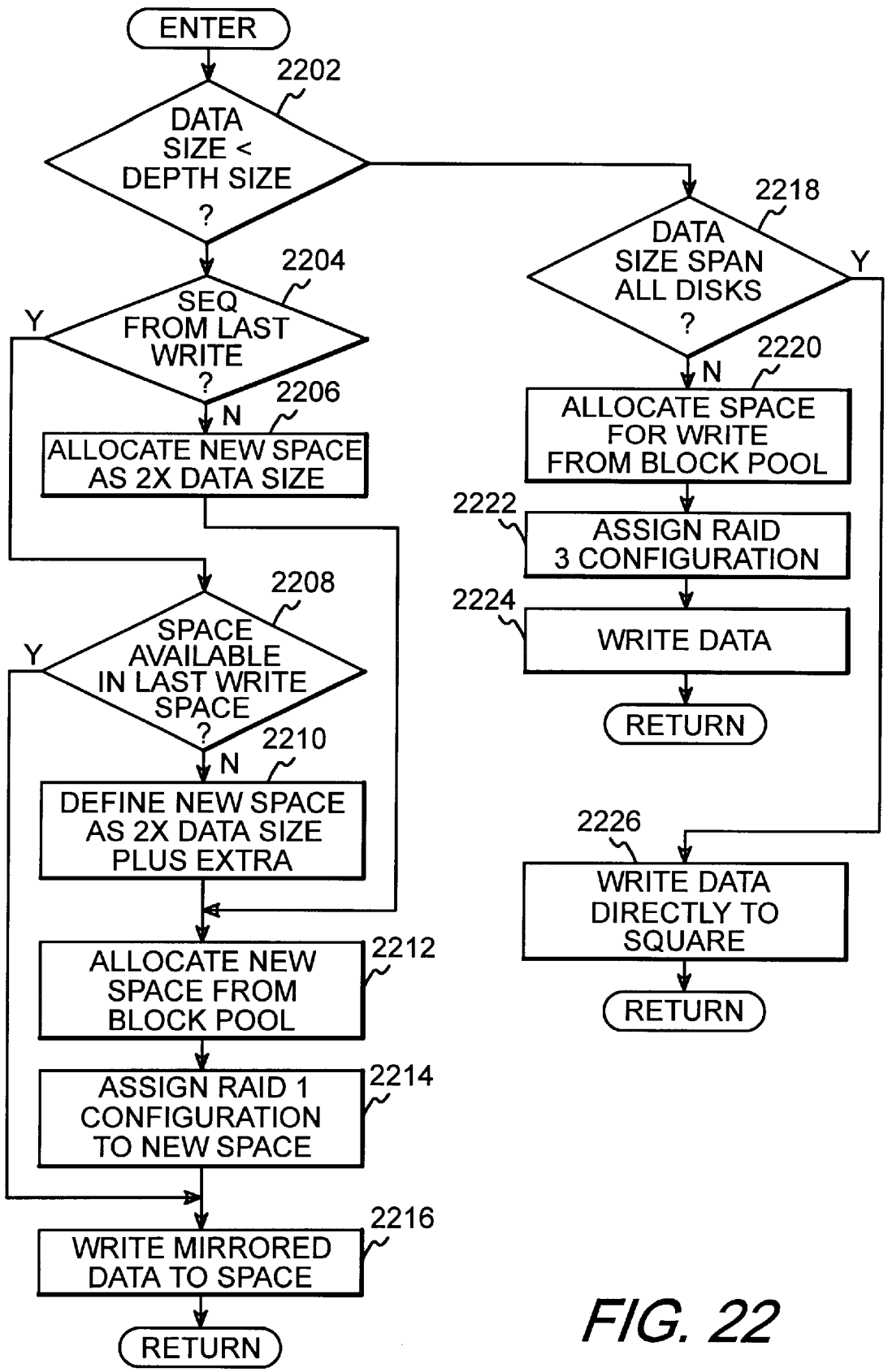
FIG. 22 shows a flowchart of the adaptive RAID write operation.

FIG. 22 shows a flowchart of the adaptive RAID write operation. Referring to FIG. 22, when a write command is received, step 2202 determines if the size of the data being written is less than the size of the depth. That is, will the write be contained on a single disk. If so, step 2202 transfers to step 2204 which determines whether this write sequentially follows the last write. If the write is not sequential, step 2204 goes to step 2206 which allocates new space for the data from the block pool. The amount of space allocated is two times the size of the data being written, since the write will be performed as a RAID 1 write, which mirrors the data. After defining the size to be allocated, step 2206 goes to step 1121 which allocates the space from the block pool, step 2214 then assigns this space to a RAID 1 configuration, and step 2216 writes the data.

If the write sequentially followed the last write, step 2204 goes to step 2208 which determines whether space remains in the space allocated to the last write to contain this write. If so, step 2208 goes to step 2216 to write the data in the previously allocated space from the block pool.

If no space is available, step 2208 goes to step 2210 which defines the space as two times the data size, plus extra space to accommodate additional sequential writes. The amount of extra space allocated varies with the number of sequential writes that have been performed recently.

After defining the space, step 2210 goes to step 2212 to allocate the space, then step 2214 assigns RAID 1 configuration to the space, and step 2216 stores the data.

If the data size is larger than the depth, step 2202 goes to step 2218 which determines whether the data size will span all the disks, that is, is the size large enough for a RAID 3 write. If the data will span all disks, step 2218 goes to step 2226, which writes the data directly to a square, since the write can be performed as a RAID 3 write, with no write penalty.

If the data size is larger than one disk, but smaller than the span of all disks, step 2218 goes to step 2220 which allocates data space for the write from the block pool. This data space is the size of the data being written, plus parity. Step 2222 then assigns this space as RAID 3 configuration, and step 2224 writes the data to the space.

Aging/Recollection Considerations

When a block pool entry is allocated, it uses up a limited resource (i.e. the blocks in the block pool). At some point it may be necessary to move the data being stored in these blocks back to their original blocks.

There are a number of considerations for this decision:

1) When block pool allocations are made for a RAID 1 operation, unused blocks are left in the original portion of the data square, which is inefficient. The allocated block pool space is also inefficient, since half of the disk blocks are used for parity, whereas storing the data back into the square, in a RAID 5 layout, uses less than half the blocks used for parity. If the RAID 1 blocks are updated frequently by the host, however, it is advantageous to leave the blocks allocated in the block pool, to avoid the overhead of constantly cleaning up and then reallocating the block pool entries.

2) When block pool allocations are made for a RAID 3 write, unused blocks are left in the original portion of the data square, which is inefficient. The allocated block pool space is efficient, however, since it is stored in a RAID 3 configuration. If entire rows are replaced, the blocks in the original portion can be given to the block pool.

3) Block pool allocations in RAID 1 configuration are usually returned to their original block locations, to free up the block pool area for other uses.

4) Depth considerations determine when and if to move RAID 3 block pool allocations back to their original locations. When a write occurs, space may be allocated at a depth less than the depth of the data in the squares, to allow a smaller write to become a RAID 3 write. In this case, the data will be moved back to the squares where it is stored more efficiently.

5) The more block pool allocations there are, the larger the configuration data structures, used to manage the block pool, become. This growth can result in longer search times and ultimately in running out of space for the configuration data structures. Therefore, the system constantly works in the background to collapse the configuration data structures back to their original rectangles configuration. The main reason to not continually collapse the configuration is because "hot spots", wherein the host updates an area of data frequently, should be left in a RAID 1 configuration.

6) When blocks are allocated for a RAID 1 allocation of a small write, extra blocks are allocated. These extra blocks are used to allow sequential small writes to use the extra blocks without additional non-consecutive allocations. These extra blocks are managed such that if the block pool is exhausted the extra blocks that are not being used can be removed and returned to the available block pool to be used for other allocations.

7) Block pool space has a different, more shallow, depth for RAID 3 allocations to ensure that less space is wasted. In this case, the system may end up with more operations is where subsequent read operations cross depth boundaries and cause a lower throughput.

Figure 23:
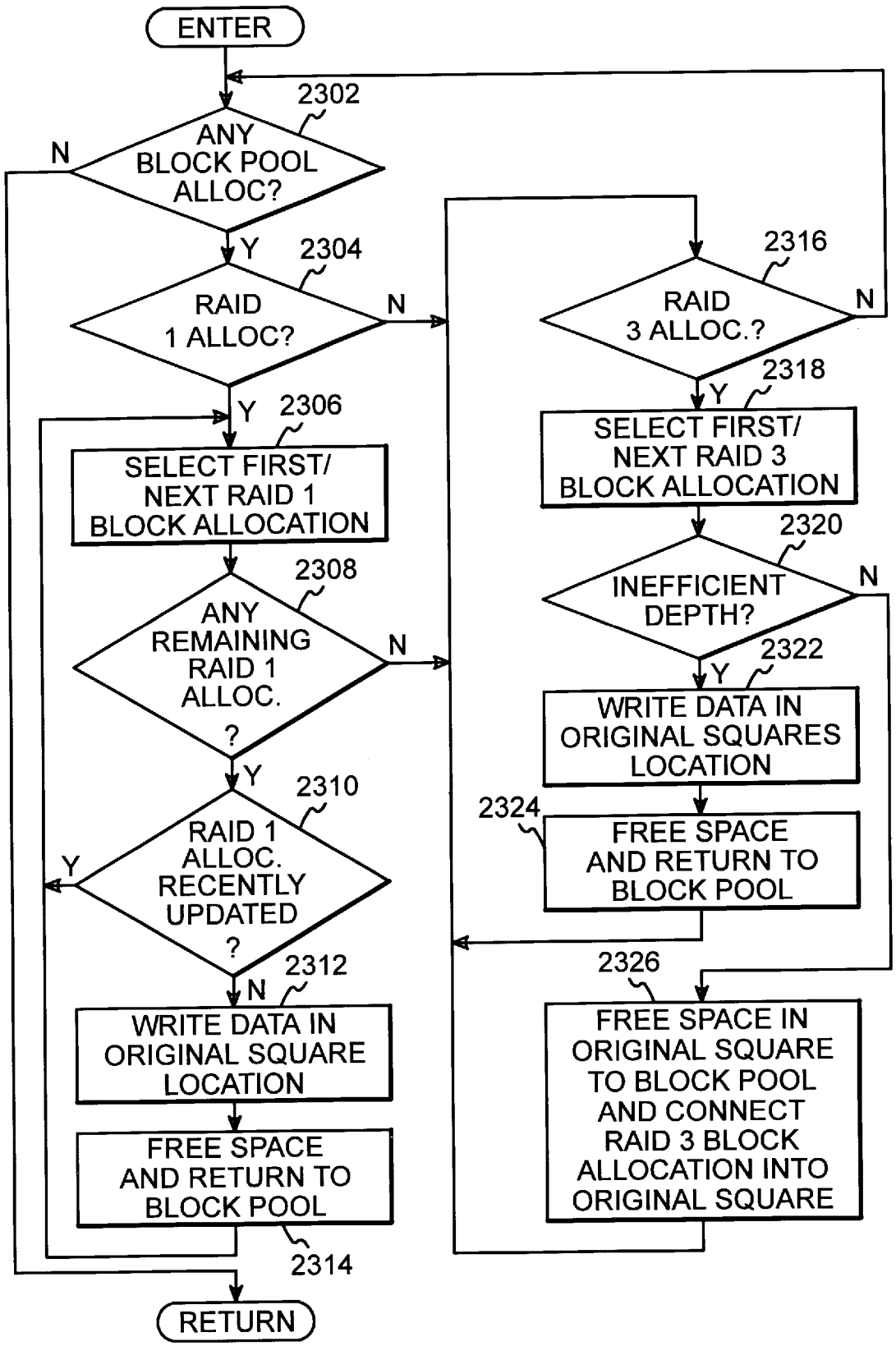
FIG. 23 shows a flowchart of the background processing of adaptive RAID.

FIG. 23 shows a flowchart of the background processing described above. Referring to FIG. 23, after entry, step 2302 determines whether any block pool allocations have been made. If not, or after processing all of them, step 2302 returns. If unprocessed block pool allocations remain, step 2302 goes to step 2304 which determines whether any RAID 1 configuration allocations are present. If so, step 2304 transfers to step 2306 which selects the first or next RAID 1 allocation. Step 2308 determines whether all RAID 1 allocations have been processed, and if not, goes to step 2310 which determines whether the RAID 1 allocation selected in step 2306 has been recently updated. If a block pool allocation has been recently updated, it will not be moved back to the squares, since it is more efficient to keep it as a RAID 1 allocation, rather that frequently re-allocating new block pool space. Although how often updates must occur to prevent rewriting back into the squares space is dependent upon the type of activity from the host, one example might be to re-write after no updates have occurred within the last second. Therefore, if the block pool allocation has been recently updated, step 2310 goes back to step 2306 to select the next block pool allocation.

If the allocation has not been recently updated, step 2310 goes to step 2312 which writes the data from the block pool allocation back into the location in the square, and step 2314 frees the space from the block pool allocation and returns it to the block pool. Step 2314 then returns to step 2306 to process the next RAID 1 block pool allocation.

After all RAID 1 block pool allocations have been processed, or if there are no RAID 1 block pool allocations, control goes to step 2316 to process RAID 3 allocations. Step 2316 determines if there are RAID 3 allocations to process, and if so, goes to step 2318 which selects the first or next RAID 3 allocation. Step 2320 then determines if this allocation has an inefficient depth, as discussed above. If so, step 2320 goes to step 2322 which writes the data back to the original squares, and then step 2324 frees the block pool allocation space and returns it to the block pool. Step 2324 then returns to step 2316 to process the next RAID 3 allocation.

If the depth is efficient, step 2320 goes to step 2326 which frees the space in the original square to the block pool, and connects the block pool allocation space, containing the RAID 3 data, into the location of the original square. Thus the data is connected into the original square without being moved. Step 2326 then returns to step 2316 to process the next RAID 3 allocation.

After all RAID 3 allocations have been processed, step 2316 returns to step 2302.

Request Processing

Adaptive RAID can easily end up with a substantial number of squares portions. These squares portions are independent and may contain data in a variety of RAID configurations. This complexity leads to several requirements and/or implementations:

1) The searching of the configuration can be linear when the configuration is small. But when the configuration gets large it can require substantial time to do linear searching. Thus it is necessary to provide additional support using hardware and/or software to limit the time spent searching the configuration data;

2) Because of the dynamic nature of the configuration, all read and write operations must lock sector ranges to assure that concurrent requests cannot cause changes to the same location.

3) Access to the configuration structures must be tightly limited to as few procedures as possible to assure integrity of the structure, thus only one process/request can be accessing and/or modifying the configuration structures at any one time. A read/write request will result in a list to be generated for the physical sectors involved. This list can only be generated after the sector range lock is executed. Once the list is generated, the configuration structures are not used, so they may be modified by other requests. The sector range lock assures that the physical sectors specified in the list cannot change position or be moved in the configuration.

4) The configuration structure can be very dynamic, it must be saved between power off situations, and it must be able to survive failures of the controller as well as short power failures.

Having thus described a presently preferred embodiment of the present invention, it will be understood by those skilled in the art that many changes in construction and circuitry and widely differing embodiments and applications of the invention will suggest themselves without departing from the scope of the present invention as defined in the claims. The disclosures and the description herein are intended to be illustrative and are not in any sense limiting of the invention, defined in scope by the following claims.

We claim:

1. A method of organizing storage devices of unequal storage capacity within an array of storage devices accessible from a host computer system, wherein data stored by said host computer system on each one of said storage devices is distributed across all storage devices in said array, said method comprising the steps of:
   (a) dividing data blocks on said storage devices to a plurality of rectangle portions, wherein a number of data blocks allocated on each storage device within each of said plurality of rectangle portions comprises a first number of unallocated data blocks equal to a second number of unallocated data blocks located on a smallest storage device having unallocated blocks; and
   (b) distributing data independently in each of said rectangle portions comprising
      (b1) when a rectangle portion comprises blocks from at least three storage devices, writing data using RAID 5 format,
      (b2) when a rectangle portion comprises blocks from two storage devices, writing data using RAID 1 format, and
      (b3) when a rectangle portion comprises blocks from only one storage device, writing data using RAID 0 format.

2. The method of claim 1 wherein step (a) further comprises the following step (a1) and wherein steps (b1), (b2), and (b3) further comprise the following steps (b1), (b2) and (b3) respectively:
   (a1) further dividing data blocks in each rectangle portion into at least one square portion, wherein each square portion comprises a number of stripes equal to a quantity of said storage devices contained within a rectangle portion containing that square portion, and wherein a stripe is a set of one or more contiguous data blocks on each storage device in the rectangle portion containing that square portion; and
   (b1) when a rectangle portion comprises blocks from at least three storage devices, writing data in each of said square portions using RAID 5 format,
   (b2) when a rectangle portion comprises blocks from two storage devices, writing data in each of said square portions using RAID 1 format, and
   (b3) when a rectangle portion comprises blocks from only one storage device, writing data in each of said square portions using RAID 0 format.

3. The method of claim 2 wherein step (a) further comprises the following step (a2) performed after step (a1) and wherein step (b) further comprises the following step (b2) performed after step (b1):
   (a2) within each rectangle portion, after dividing data blocks into a plurality of square portions, allocating any remaining blocks to a partial portion; and
   (b4) writing data in each partial portion, as unstriped data.

4. The method of claim 2 further comprising the following steps:
   (c) exchanging data in said sets of blocks of each of said plurality of square portions comprising the steps of
      (c1) selecting a square portion,
      (c2) locating a diagonal set of blocks within said square portion selected in step (c1), wherein said diagonal set of blocks within said square portion selected in step (c1) starts at a first set of blocks in a first stripe of said square portion selected in step (c1) and said diagonal set of blocks ends at a last set of blocks in a last stripe of said square portion selected in step (c1), and
      (c3) exchanging all sets of blocks equidistant from said diagonal set of blocks located in step (c2), on opposite sides of said diagonal set of blocks located in step (c2), and in a line perpendicular to said diagonal set of blocks located in step (c2);
   (d) adding or removing a storage device; and
   (e) exchanging data in said sets of blocks of each of said plurality of square portions comprising the steps of
      (e1) selecting a square portion,
      (e2) locating a diagonal set of blocks within said square portion selected in step (e1), wherein said diagonal set of blocks within said square portion selected in step (e1) starts at a first set of blocks in a first stripe of said square portion located in step (e1) and said diagonal set of blocks ends at a last set of blocks in a last stripe of said square portion located in step (e1), and
      (e3) exchanging all sets of blocks equidistant from said diagonal set of blocks located in step (e2), on opposite sides of said diagonal set of blocks located in step (e2), and in a line perpendicular to said diagonal set of blocks located in step (e2).

5. The method of claim 4 wherein one of said storage devices in said array comprises a parity device and wherein said parity device is excluded from said quantity of said storage devices in step (a1), and further wherein data blocks of said parity device are not exchanged in steps (c) and (e).

6. The method of claim 5 wherein step (c) further comprises the following step (c0) performed before step (c1) and wherein step (e) further comprises the following step (e4) performed after step (e3):
   (c0) exchanging data in data blocks of said parity device with data in data blocks of each of said square portions, comprising the steps of
      (c0a) numbering each storage device,
      (c0b) selecting a square portion from said plurality of square portions,
      (c0c) numbering the stripes within said square portion selected in step (c0b),
      (c0d) selecting a stripe from said square portion selected in step (c0b),
      (c0e) exchanging a set of data blocks of said parity device with a set of data blocks in said stripe selected in step (c0d), said set of data blocks in said stripe selected in step (c0d) being contained within a device having a number equal to a number of said stripe selected in step (c0d),
      (c0f) repeating steps (c0d) and (c0e) for each stripe of said square portion selected in step (c0b), and
      (c0g) repeating step (c0b) through step (c0f) for each of said plurality of square portions; and
   (e4) exchanging data in data blocks of said parity device with data in data blocks of each of said square portions, comprising the steps of
      (e4a) numbering each storage device,
      (e4b) selecting a square portion from said plurality of square portions,
      (e4c) numbering the stripes within said square portion selected in step (e4b),
      (e4d) selecting a stripe from said square portion selected in step (e4b), (e4e) exchanging a set of data blocks of said parity device with a set of data blocks in said stripe selected in step (e4d), said set of data blocks in said stripe selected in step (e4d) being contained within a device having a number equal to a number of said stripe selected in step (e4d), (e4f) repeating steps (e4d) and (e4e) for each stripe of said square portion selected in step (e4b), and (e4g) repeating step (e4b) through step (e4f) for each of said plurality of square portions.

* * * * *